US006571188B1

(12) United States Patent
Clarridge et al.

(10) Patent No.: US 6,571,188 B1
(45) Date of Patent: *May 27, 2003

(54) PDA INSTRUMENT/PROCESS CALIBRATOR

(75) Inventors: Ron Clarridge, Webster, NY (US); Lewis Frank, Rochester, NY (US); Bill Gustafson, Rochester, NY (US); Mike Pantano, Kent, NY (US); Tim Tetreault, West Henrietta, NY (US); Ken Vandewater, Spencerport, NY (US); Xu-Ming Wang, Rochester, NY (US)

(73) Assignee: Fluke Corporation, Everett, WA (US)

( * ) Notice: Subject to any disclaimer, the term of this patent is extended or adjusted under 35 U.S.C. 154(b) by 12 days.

This patent is subject to a terminal disclaimer.

(21) Appl. No.: 09/641,797

(22) Filed: Aug. 18, 2000

Related U.S. Application Data

(63) Continuation-in-part of application No. 09/638,337, filed on Aug. 14, 2000.

(51) Int. Cl.⁷ .............................................. G06F 19/00
(52) U.S. Cl. ....................... 702/104; 702/85; 702/116
(58) Field of Search ................... 702/85, 104, 116–117; 709/213–214, 216, 62; 710/72–74; 379/93.05, 93.25; 439/928.1, 945–946

(56) References Cited

U.S. PATENT DOCUMENTS

| | | | | |
|---|---|---|---|---|
| 5,666,495 A | * | 9/1997 | Yah .............................. | 710/62 |
| 6,241,537 B1 | * | 6/2001 | Tate et al. ................ | 439/928.1 |
| 6,266,539 B1 | * | 7/2001 | Pardo .......................... | 455/556 |
| 6,308,201 B1 | * | 10/2001 | Pivowar et al. ............. | 709/214 |

OTHER PUBLICATIONS

Stephen Jacobs, Kodak turns the Palm into a camera, Democrat & Chronicle, Jun. 12, 2000, 2 pages, Rochester, New York.
Palm–SPEC tm Spectrophotometer, product sheets, 5 pages, www.Oceanoptics.com, Jun. 5, 2000.
Gaagetrak tm V4, The world standard in calibration management software, 1 page. http://qualitymag.com/quick info.
Ionics announces Pocket Genesis for Pocket PC, 1 page, www.controleng.com.
Michael Bradford, High technology keeps Disney's risks in hand, 2 pages. Reprint from Business Insurance, a publication of Crain Communications Inc. Feb. 7, 2000.
Datastick Systems. My Corder Products. 8 sheets, product sheets, etc. www.datastick.com.
Tangent Systems, Inc. Group of 7 product sheets in folder relating to Versid.

* cited by examiner

Primary Examiner—Bryan Bui
(74) Attorney, Agent, or Firm—Stephen B. Salai, Esq.; Donna P. Suchy, Esq.; Harter, Secrest & Emery LLP

(57) ABSTRACT

An instrument or process calibrator includes a housing, a traceable, controllable calibration source in the housing, the calibration source including memory for storing identifying information about the calibration source, a data connector coupled to the calibration source, a removable hand held computer preferably a PDA, attached to the housing, and connected to the data connector, the computer including user input means for receiving a control input user for controlling the calibration source, and output means, preferably graphical output means for displaying the identifying information and calibration results to the user.

5 Claims, 50 Drawing Sheets

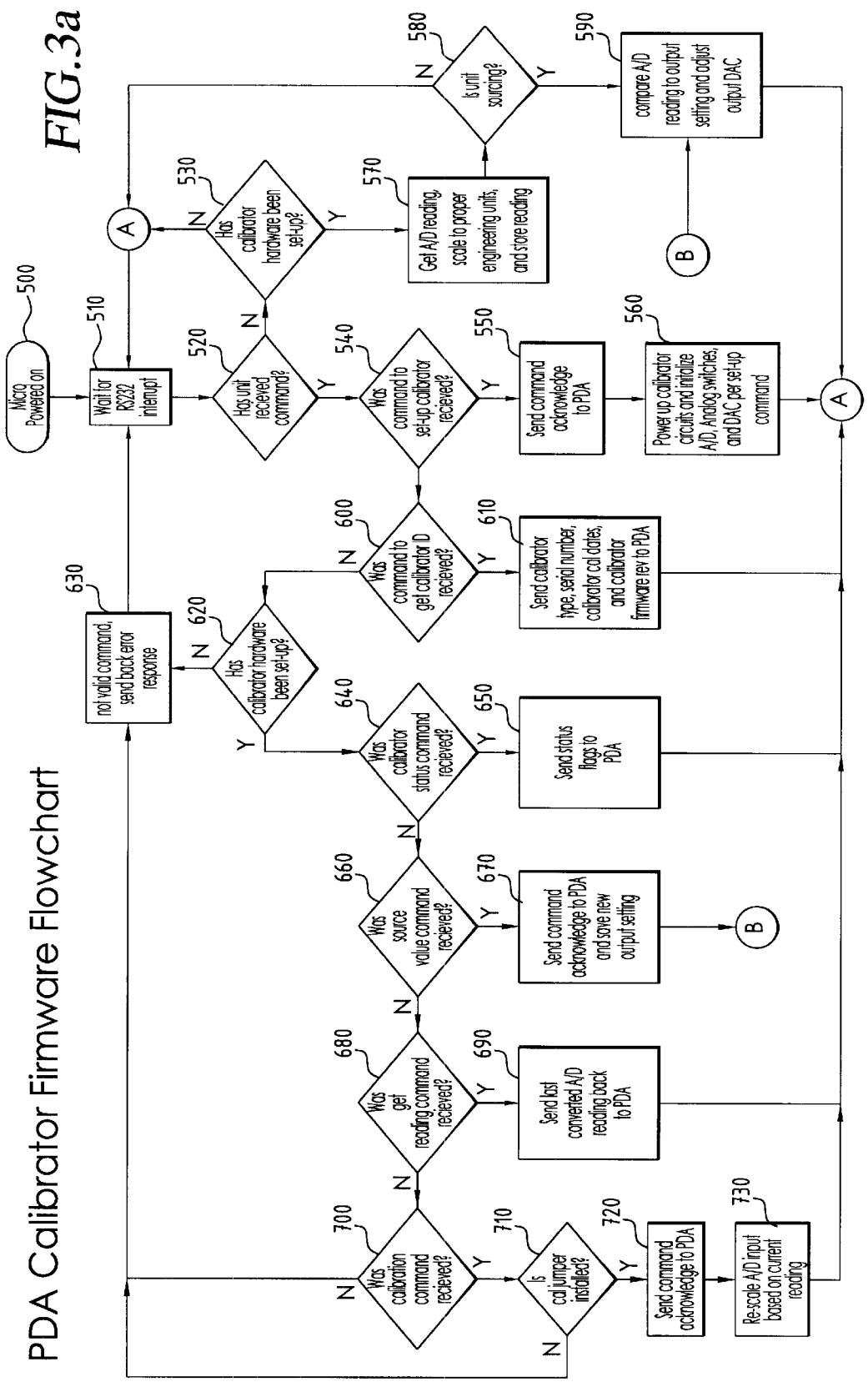

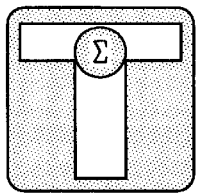

Transmation
Products Group

QuikDoc-Palm
Version 0.1

---

Please input your name here:

Emulator

[ Enter ]

*FIG.4a*

| Test Setup Form | ⓘ |

Instrument: _____
Calibrator 1: _____
Calibrator 2: _____
Calibrator 3: _____
Calibrator 4: _____

Input Entry: ▽Manual
Output Entry: ▽Manual

[ Exit ]  [ Additional Info ]  [ Start ]
              217              346

*FIG.4b*

| Extended Information | ⓘ |

Temperature: _____
Rel Humidity: _____
Baro Pressure: _____

Description:
_____
_____
_____

[ Exit ]  [ Basic Info ]  [ Start ]
             218          346

*FIG.4c*

| Test Setup Form | ⓘ |

Instrument: _____
Calibrator 1: _____
Calibrator 2: _____
Calibrator 3: _____
Calibrator 4: _____

Input Entry:  Manual
Output Entry: Auto Input
              Auto Output
[ Exit ]  [ A  Auto Pressure  ]art

```
[Instruments]                    (i)
Manufact'r    Model      Serial #
Rosemount     3144       1234567

Lookup: _____
[Add New] [Copy New] [Show] [OK]
    ↳
    222
```

FIG.4f

```
[Add New Instrum (1/3)]              (i)
Instrum Tag: |_____
       Loop: _____
      Model: _____
 Serial Num: _____
  Manufact'r:
   Location:

[▷]  [Cancel] [OK]
      ↳
     262
```

FIG.4g

```
[Add New Instrum (2/3)]              (i)
Last Cal Date: _____
 Cal Due Date: _____
  Cal Interval: _____ Months
  Descriptions:
                _____
                _____
                _____

[◁] [▷] [Cancel] [OK]
 ↳   ↳
266  264
```

FIG.4h

```
[Add New Instrument (3/3)]           (i)
   Input EU:  ▽
Input Range:  _____ - _____
  Output EU:  ▽
Output Range: _____ - _____
 Error Unit:  ▽ EU
 Error Limit: _____

[◁]       [Cancel] [OK]
```

FIG.4i

Add New Instrument (3/3)

- Input EU: [mA / Ohm / <Add New>]
- Input Range:
- Output EU: ▽
- Output Range:
- Error Unit: ▽ EU
- Error Limit:

[◁] [Cancel] [OK]

FIG.4j

Add New Instrument (3/3)

- Input EU: ▽
- Input Range:
- Output EU: [mA / Ohm / <Add New>]
- Output Range:
- Error Unit: ▽ EU
- Error Limit:

[◁] [Cancel] [OK]

FIG.4k

Add New Instrument (3/3)

- Input EU: ▽
- Input Range:
- Output EU: ▽
- Output Range:
- Error Unit: % FS
- Error Limit: EU

[◁] [Cancel] [OK]

FIG.4l

Calibrators

| Manufact'r | Model | Serial # |
|---|---|---|
| Altek | 422 | 1234567 |

Lookup: _____

[Add New] [Copy New] [Show] [OK]

298

| Calibrator Info | |
|---|---|
| Manufactor: | Altek |
| Model: | 422 |
| Serial Num: | 12345678 |
| Last Cal Date: | |
| Cal Due Date: | |
| Cal Interval: | Months |
| Descriptions: | |

[ OK ]

| Manufacturers | |
|---|---|

Altek
Rosemount
<Add New>

[ Cancel ] [ OK ]

| Add New Manufacturer | |
|---|---|

[ Cancel ] [ OK ]

| Locations | |
|---|---|

[ Add New ] [ Copy New ] [ Show ] [ OK ]
         246

Thank you!
You may power off the Palm
and HotSync the data
to the PC database.
or
Start a new test
and HotSync all of them
later

FIG.6

| Name | Exist on Palm | Exist on PC | Hot Synch'd |
|---|---|---|---|
| Instrument | Yes | Yes | Yes |
| Calibrator/Asset | Yes | Yes | Yes |
| Calibration Procedure | Yes | Yes | Yes |
| Calibration Results (2 Tables: Info&Data) | Yes | Yes | Yes |
| Manufacturer | Yes | Yes | Yes |
| Instrument Location | Yes | Yes | Yes |
| Engineering Units | Yes | Yes | Yes |
| User | Yes | Yes | Yes |
| Calibration History (2 Tables: Info&Data) | No | Yes | No |
| Company | No | Yes | No |
| Access | No | Yes | No |

FIG.7

| Field Name | Type |
|---|---|
| Instrument Index | AutoNumber-Key |
| Tag | Text |
| Loop | Text |
| Location Index | Number |
| Manufacturer Index | Number |
| Model | Text |
| Serial Number | Text |
| Last Cal Date | Date |
| Cal Due Date | Date |
| Calibration Interval (Days) | Number |
| Description | Text |
| Input Engineering Units Index | Number |
| Input Zero Scale Value | Float Number |
| Input Full Scale Value | Float Number |
| Output Engineering Units Index | Number |
| Output Zero Scale Value | Float Number |
| Output Full Scale Value | Float Number |
| Error Unit | Enumeration: %FS,Eng.Units |
| Allowable Error | Float Number |

FIG.8

| Field Name | Type |
|---|---|
| Calibrator Index | AutoNumber-Key |
| Manufacturer Index | Number |
| Model | Text |
| Serial Number | Text |
| Last Cal Date | Date |
| Cal Due Date | Date |
| Calibration Interval | Number |
| Description | Text |

FIG.9

| Field Name | Type |
|---|---|
| Calibration Procedure Index | AutoNumber-Key |
| Name | Text |
| Instructions | Text |

FIG.10

| Field Name | Type |
|---|---|
| Calibration Results info Index | AutoNumber-Key |
| Instrument Index | Number |
| Procedure Index | Number |
| Date/Time | Date/Time |
| Operator | Text |
| Ambient Temperature | Text |
| Relative Humidity | Text |
| Barometric Pressure | Text |
| Description | Text |
| Calibrator 1 Index | Number |
| Calibrator 2 Index | Number |
| Calibrator 3 Index | Number |
| Calibrator 4 Index | Number |
| Device Input Data Entry | Enumeration: Manual Entry/Auto-Calibrator Input/Auto-Calibrator Output/Auto-Calibrator Pressure (MAP only) |
| Device Output Data Entry | Enumeration: Manual Entry/Auto-Calibrator Input/Auto-Calibrator Output/Auto-Calibrator Pressure (MAP only) |
| Number Calibration Points | Number |
| Calibration Completed | Boolean |
| In Tolerance | Boolean |

FIG.11

| Field Name | Type |
|---|---|
| Calibration Results Data Index | AutoNumber-Key |
| Calibration Results Info Index | Number |
| Data Type | Enumeration: AsFound/AsLeft |
| Device Expected Input | Number |
| Device Actual Input | Number |
| Device Expected Output | Number |
| Device Actual Output | Number |
| Error Limit | Number |
| Actual Error | Number |
| Pass | Boolean |

FIG.12

| Field Name | Type |
|---|---|
| Manufacturer Index | AutoNumber-Key |
| Manufacture Name | Text |

FIG.13

| Field Name | Type |
|---|---|
| Location Index | AutoNumber-Key |
| Location 1 | Text |
| Location 2 | Text |
| Location 3 | Text |

FIG.14

| Field Name | Type |
|---|---|
| Engineering Units Index | AutoNumber-Key |
| Units Name | Text |

FIG.15

| Field Name | Type |
|---|---|
| User Index | AutoNumber-Key |
| User First Name | Text |
| User Last Name | Text |
| User Id | Text |
| Password | Text |
| Access Index | Number |

FIG.16

| Field Name | Type |
|---|---|
| Company Index | AutoNumber-Key |
| Company Name | Text |
| Address 1 | Text |
| Address 2 | Text |
| CityStateZipCode | Text |

FIG.17

| Field Name | Type |
|---|---|
| Access Index | AutoNumber-Key |
| Description | Text |
| Level | Number |

PDA INSTRUMENT/PROCESS CALIBRATOR

This application is a continuation-in-part of application Ser. No. 09/638,337, filed Aug. 14, 2000 for PDA INSTRUMENT/PROCESS CALIBRATOR.

FIELD OF THE INVENTION

This invention relates generally to instrument calibrators and more particularly to an instrument calibrator combined with a hand held personal computer, preferably a personal digital assistant (PDA) having graphical input and output, and a stylus for user interaction with the graphical interface.

BACKGROUND OF THE INVENTION

The use of calibrators for regularly verifying the accuracy of instruments used in process automation and other applications has been known for some time. Manual calibrators provide a signal source of traceable accuracy and, optionally, measuring capabilities. The most basic calibration method includes the steps of connecting the verifiable source to the instrument or device being calibrated and noting the reading or action produced by the instrument in response to the source. If the response or reading is within predetermined acceptable limits, the reading is simply recorded along with the date and additional information such as the operator's name, and identification code for the calibrator, the identity of the device being calibrated and similar information. If the instrument reading is outside acceptable limits, remedial steps are taken to recalibrate the instrument or device.

For example, process instrumentation commonly utilizes a current control signal in the range of 4 to 20 milliamps. A device such as a valve is connected in an open or closed loop control system that controls the position of the valve. Conventionally, a 4 milliamp signal completely closes the valve while a 20 milliamp signal completely opens the valve or vice versa. A metering device such as a current meter can be connected to the valve to monitor the magnitude of the current signal applied to the valve. Alternatively, a recorder such as a chart record may be connected to record the position of the valve during a process. Both the accuracy of the recording instrument and the response of the valve to the control signal must be periodically tested to insure proper operation of the process.

Calibrators that provide a traceable verifiable signal in the 4 to 20 milliamp range are widely employed for this purpose.

It is desirable to retain the information associated with the calibration of process instrumentation for some time after the calibration has been carried out so that the performance of the instruments can be monitored. Therefore, it has been common to keep written records or enter data taken by calibration technicians into a database for later retrieval, for the analysis of trends and for other purposes including verifying that the necessary periodic calibrations have been in fact carried out.

For the most part, data related to calibration has been recorded manually on forms provided for that purpose, and thereafter entered into a database, if required, usually maintained on a personal computer, directly from the forms. This approach is time consuming, labor intensive, and may lead to errors unless great care is taken in the recording of the data, the entry of the data into a computer, and the verification of the entered data.

To avoid some of these time consuming, error prone manual steps, documenting calibrators have been introduced. Documenting calibrators automate one or more of the steps previously performed manually. Documenting calibrators typically provide both a traceable source and measurement capability in a single unit. Documenting calibrators typically include memory for recording measured data to eliminate the need for manually entering the data on a form. Some documenting calibrators provide multiple functions in a single unit. For example, a documenting calibrator may provide a traceable voltage and current sources as well as variable frequency sources. Simulated thermocouple output sources may also be provided.

While documenting calibrators provide a number of advantages over more basic calibrators, they are presently quite expensive and even more important, require extensive set up before they can be used. Information concerning the device or instrument to be calibrated must be entered into the documenting calibrator before a calibration procedure can be carried out. Existing documenting calibrators require that information concerning each instrument to be calibrated, including the identification of the instrument, its location, the procedure for making the calibration, and the identity of the calibrator be downloaded to the documenting calibrator each time a new instrument or device is added to those already calibrated. This process is inconvenient and time consuming, and requires that the documenting calibrator be physically connected to a stand alone computer each time a new instrument/device is added. Among the data that must be downloaded to the documenting calibrator are tag IDs and associated calibration procedures.

There is a need for an instrument/process calibrator that overcomes the disadvantages of manual calibrators, and at the same time increases the convenience of documenting calibrators by making them easier to use and more versatile.

It is an object of this invention to provide an instrument or process calibrator that uses a general purpose computer, preferably a personal digital assistant (PDA) or similar device to provide the human interface to the calibrator, to store information relating to the calibration itself, so as to automate, to a greater or lesser extent, the calibration process, and to store the results of the calibration.

It is another object of this invention to provide a general purpose computer, preferably a personal digital assistant, that is configured to both store information concerning an instrument or process to be calibrated, and provide for the entry and storage of data taken during the calibration process.

It is a further object of this invention to provide an instrument/process calibrator that uses a portable general purpose computer to temporarily store calibration information and results during the calibration process, and to upload that information to a database on another computer for long term storage and analysis.

SUMMARY OF THE INVENTION

Briefly stated, and in accordance with a presently preferred embodiment of the invention, an instrument or process calibrator includes a housing, a traceable, controllable calibration source in the housing, the calibration source including memory for storing identifying information about the calibration source, a data connector coupled to the calibration source, a removable hand held computer preferably a PDA, attached to the housing, and connected to the data connector, the computer including user input means for receiving a control input user for controlling the calibration source, and output means, preferably graphical output means for displaying the identifying information and calibration results to the user.

In accordance with another aspect of the invention, the hand held computer includes an input device for receiving calibration data from a user and memory for storing the calibration data.

In accordance with another aspect of the invention, a hand held computer includes an output circuit for transferring the stored calibration data and the identifying information to another computer.

In accordance with another aspect of the invention, the hand held computer or PDA includes a touch screen for receiving data and control inputs from the user.

The PDA calibrator of this invention utilizes a common user interface to a family of calibrators. By providing a familiar interface, different calibrators may be used by a previously trained technician without the need for extensive additional training. The use of a consistent familiar graphical interface eliminates the usual array of buttons and knobs that traditional hand held calibrators have required for operation. The common interface permits operators to be trained quickly, and eliminates the need for retraining for new calibrator devices. The ability to transfer data from the PDA to a host computer and back provides a fast and simple link to share data and files with the host computer. The host computer is not required, however, as the software resident in the PDA can operate on a stand alone basis if required.

The calibrators of this invention include both source and read functions with accuracies equal to or exceeding existing calibrators. The calibrators of this invention are low cost alternatives to single purpose documenting calibrators in current use. By eliminating the need to transfer information relating to new instruments from a host computer to a documenting calibrator, the PDA calibrator of this invention provides unprecedented versatility at low cost. The PDA calibrators can operate on a stand alone basis to allow a calibration technician to use the PDA and its accompanying software if the field to build a device data base with each new calibration, thereby eliminating the time consuming need to prepopulate a data base from a host computer prior to performing calibrations.

The PDA calibrator is adapted to integrate easily with existing maintenance practices and systems.

The PDA calibrator of this invention allows calibration data to be gathered and shared much more easily than heretofore possible. A calibration technician using the PDA calibrator on the plant floor, can gather, evaluate and share information company wide and even worldwide much more efficiently than has been heretofore possible.

A PDA calibrator in accordance with this invention can be used by a technician to calibrate a new instrument by entering information on the instrument or device to be calibrated into the PDA using the PDA graphical user interface and a pen or stylus. If information concerning the device or instrument already exists and and can be easily retrieved from data stored on the PDA.

While the preferred embodiment of the invention utilizes a calibrator base to perform the calibration, thereby allowing data to be read directly from the calibrator, data can be entered manually on the PDA if desired, for example if no suitable calibrator base is available. The PDA software operates on a stand alone basis that can be used either with or without a calibrator attached to the PDA. This allows non-electronic calibrations that are normally made manually, such as scales and gas analyzers to be performed, using the PDA calibrator.

As calibrations are completed, non-automatically retrieved calibration information is entered on the PDA, and the results of the calibration are uploaded to the host computer via a hot sync data transfer function. This creates a permanent electronic record and allows the user to create a variety of records including certificates of calibration if desired. A variety of desk top applications already in existence can be easily interfaced with the PDA calibrator.

By utilizing existing PDAs, technicians using the PDA calibrators have access to all other functions of the PDA, which allow them to schedule the work and appointments, download compatible third party software such as conversion and electrical calculators and look up tables, all enhancing their overall productivity.

BRIEF DESCRIPTION OF THE DRAWINGS

The novel aspects of the invention are set forth with particularity in the appended claims. The invention itself, together with further objects and advantages thereof may be more readily comprehended by reference to the following detailed description of a presently preferred embodiment thereof, taken in conjunction with the accompanying drawings, in which:

FIG. 3A is a flow chart showing the operation of the calibrator base resident software of the PDA calibrator;

FIG. 6 is a list of tables stored on the PDA, host computer or both;

FIG. 7 is a list of the fields in the instrument table;

FIG. 8 is a list of the fields in the calibrator table;

FIG. 9 is a list of the fields in the calibration procedure table;

FIG. 10 is a list of the fields in the calibration results info table;

FIG. 11 is a list of the fields in the calibration results data table;

FIG. 12 is a list of the fields in the manufacturer table;

FIG. 13 is a list of the fields in the location table;

FIG. 14 is a list of the fields in the engineering units table;

FIG. 15 is a list of the fields in the user table;

FIG. 16 is a list of the fields in the company table;

FIG. 17 is a list of the fields in the access table;

DETAILED DESCRIPTION OF THE PREFERRED EMBODIMENT

Figure 1:
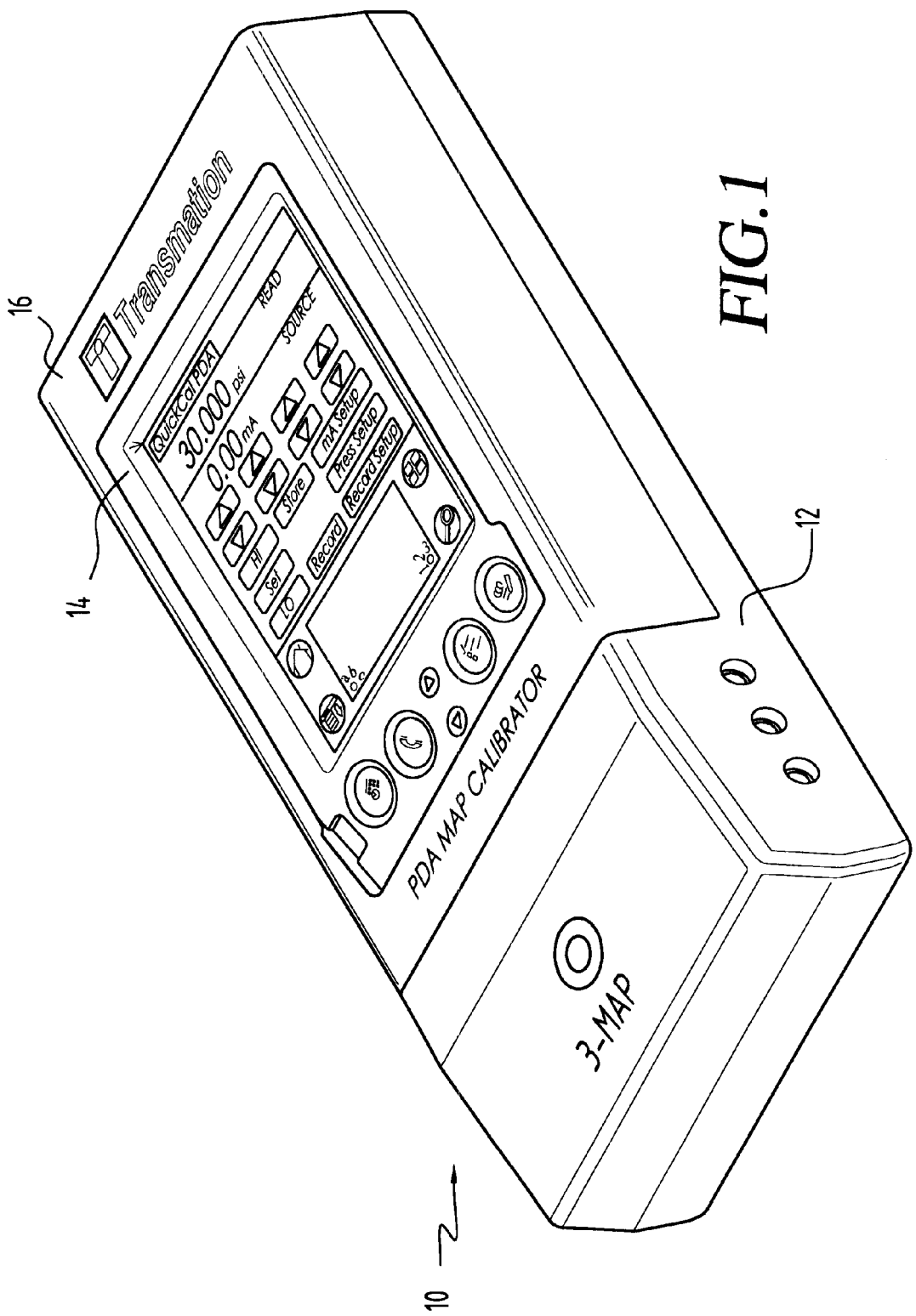
FIG. 1 is a drawing of a PDA calibrator in accordance with this invention.

Referring now to FIG. 1, a PDA calibrator designated generally at 10 includes a base 12 in which the calibration source and associated control and interface circuitry are housed. A general purpose hand held computer, such as a personal digital assistant 14 is physically attached to the base by a slidable removable cover 16 and electrically connected by a connector to be shown and described below.

Figure 2:
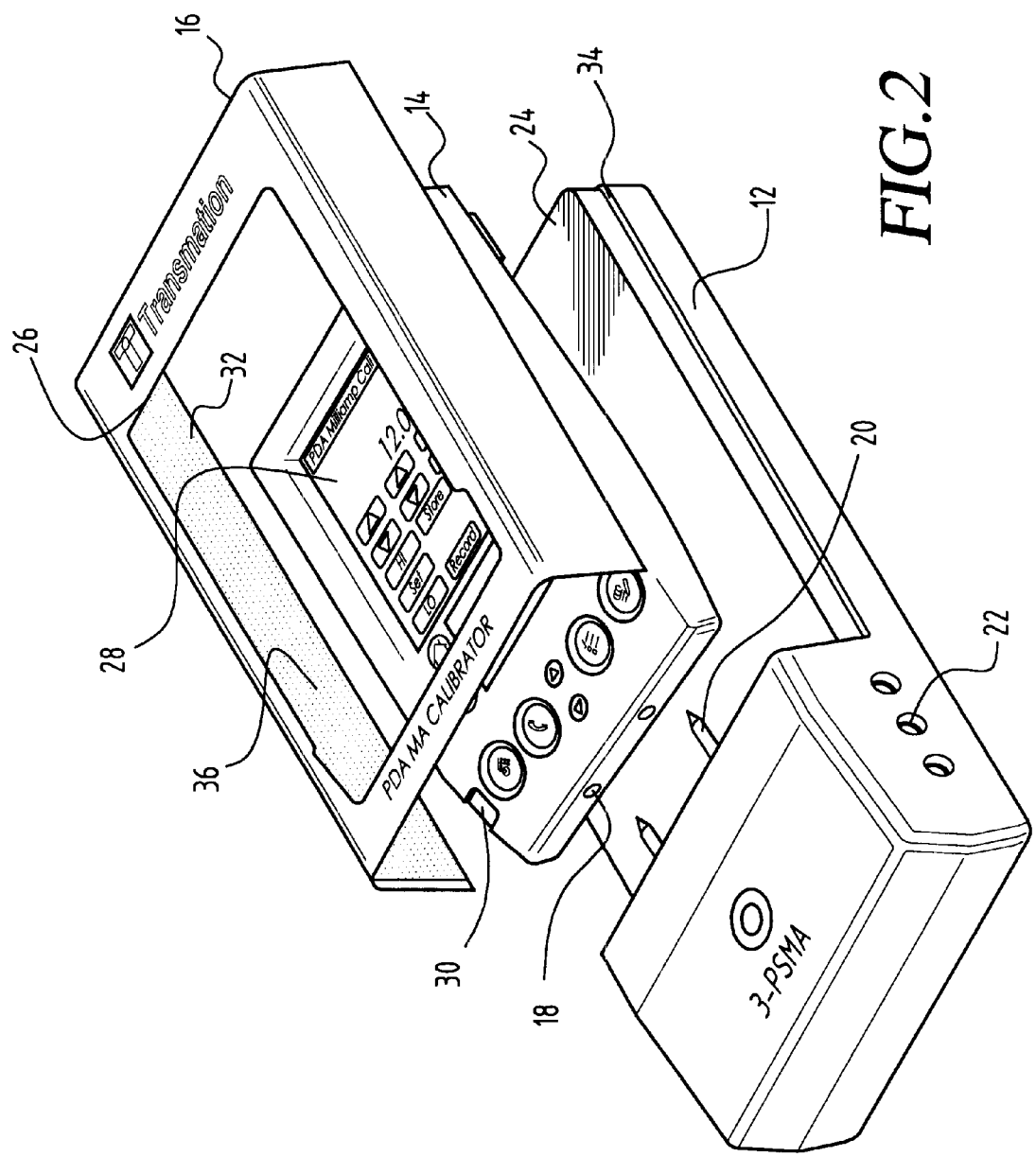
FIG. 2 is an exploded view of the PDA calibrator.

FIG. 2 is an exploded view of the PDA calibrator showing the components thereof separately. The calibrator base 12 preferably includes a plurality of connectors 22 to which test leads are attached for connecting the calibrator to an instrument or process device to be calibrated. The base has a generally flat surface 24 on which a general purpose computer, such as a personal digital assistant 14 rests. A connector 18 on PDA 14 engages a connector 20 on the calibrator base 12 to provide for communication between the PDA 14 and the calibrator base 12. A preferably stamped metal cover 16 holds the PDA 14 to the base 12. While stamped metal is preferred, other materials such as plastic of suitable rigidity may also be used. Cover 16 preferably has an opening 26 through which the touch screen 28 of the PDA can be viewed and accessed, and through which the control button 30 can be operated.

Preferably, cover 16 has inwardly extending flanges 32 that engage grooves 34 on the sides of the calibrator base to firmly hold the cover and the PDA to the base. Cover 16 is also preferably provided with strips of resilient material, such as foamed rubber, felt strips 36 or the like to securely hold the PDA 14 in position and protect it from damage by scratching or the like.

While a slidably mounted cover is preferred, hinges or other means of attaching the cover to the base may also be employed, so long as the cover can be opened or removed to provide access to the PDA, and closed or attached to firmly hold the PDA to the base with the connectors engaged.

Figure 3:
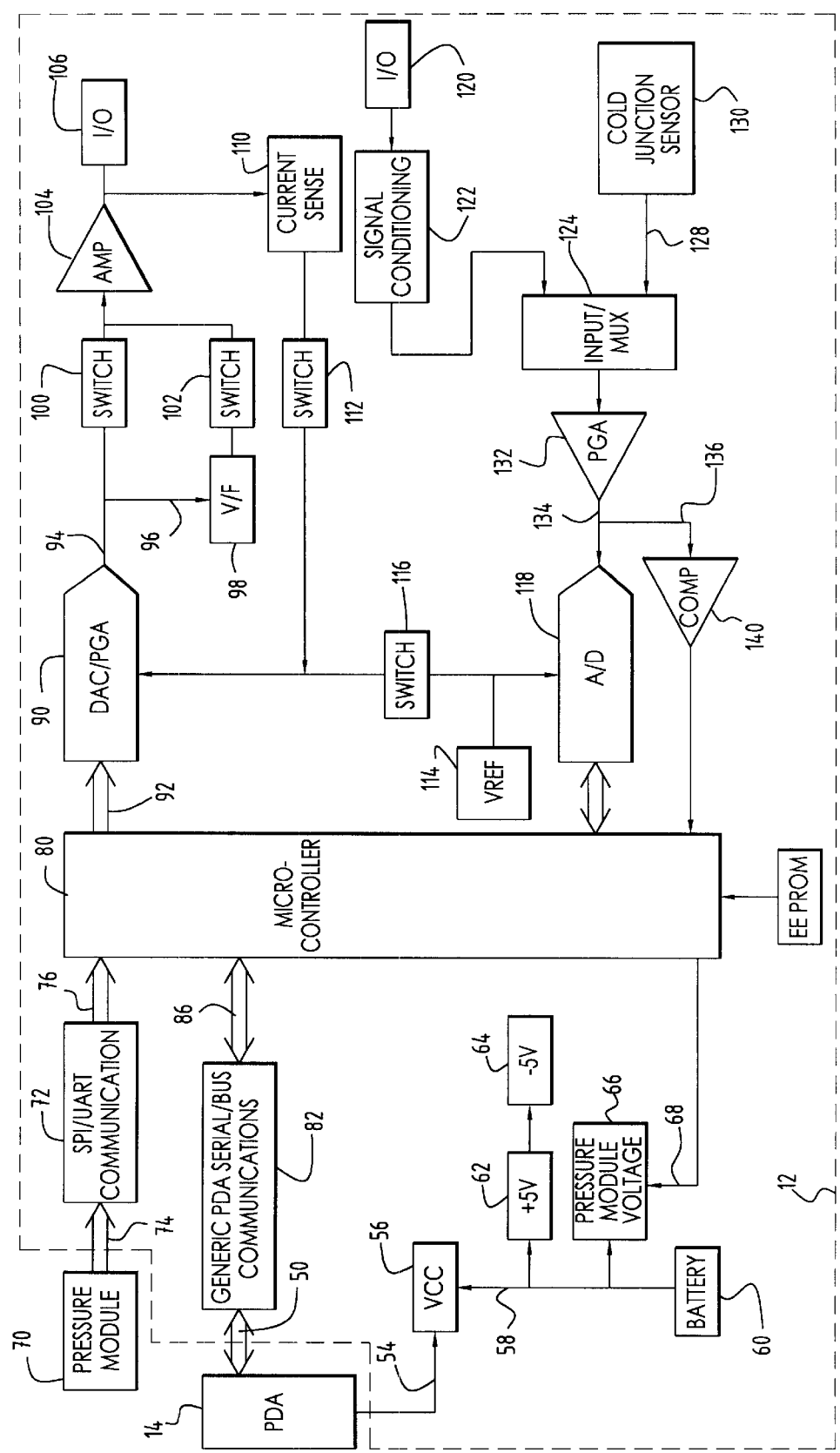
FIG. 3 is a block diagram of the circuit of the calibration base portion of the PDA calibrator.

FIG. 3 is a block diagram of the circuit of a presently preferred embodiment of the PDA calibrator of this invention. PDA 14, which may be any portable general purpose computer or hand held personal digital assistant including, but not limited to PDAs made by any particular manufacturer or even PDAs utilizing any of a variety of available operating systems. Compatible operating systems include PALM-OS, Windows CE, and others.

PDA 14 is connected to calibrator base 12 by a multi pin connector 50 that carries a plurality of serial communication lines and a DC power line. Power line 54 is connected to a voltage control module 56 which has an input 58 connected to a battery 60. Battery 60 is also connected to a +5 volt regulator 62 and −5 volt converter 64 which provide operating voltages to other components of the calibrator base.

Battery 60 is also connected to pressure module voltage control circuit 66 that provides operating voltage to a pressure calibration module 70, and also responds to a pressure shut down signal applied to input 68 to shut down power to pressure module 70.

Pressure module 70 is connected to interface 72, which is preferably a serial pressure interface/UART signal converter by way of an input connector 74. Output 76 of interface 72 is connected to data and clock input/output terminals of programmable micro controller 80.

PDA interface connector 50 is connected to generic PDA serial/bus communications adapter 82. Adapter 82 provides signal conditioning and timing functions for bi-directional data transfer between PDA 14 and microcontroller 80 by way of clock and data connections 86. Micro controller 80 is a general purpose programmable micro computer that includes both random access memory and program memory. The operation of micro controller 80 as controlled by software resident in the program memory will be described below. While the presently preferred embodiment of the invention uses serial RS-232 protocol, the invention is not so limited. Other parallel or serial interfaces such as USB, RS432 or the like may be employed. The invention is not limited to any particular parallel or serial protocol.

Micro controller 80 may be any of a number of suitable micro controllers, such as an MC68HC705L16 manufactured by Motorola or a similar general purpose microcontroller.

Micro controller 80 is connected to a digital to analog converter/programmable gain amplifier (DAC/PGA) 90 by data bus 92. The output 94 of DAC/PGA 90 is connected to an input 96 of voltage to frequency converter 98. Switches 100 and 102 selectively insert or remove voltage to frequency converter 98 from the circuit, so that amplifier 104 provides either a controlled voltage signal of a controlled frequency signal to input output port 106. The output of output amplifier 104 is also connected to an input of current sense circuit 110. The output of current sense circuit 10 is connected through a switch 112 to a voltage reference input of DAC/PGA 90. A voltage reference source 114 is connected to DAC/PGA 90 by way of switch 116, and to A/D converter 118.

An input signal is applied to input/output port 120 and then to signal conditioner 122. An output of signal conditioner 122 is connected to an input of multiplexer 124, which has another input 128 connected to the output of a cold junction sensor 130. Output of multiplexer 124 is connected to a programmable gain amplifier 132 having an output 134 connected to an input of A/D converter 118. The output of A/D converter 118 is connected to micro controller 80. Output of PGA 132 is also connected to an input 136 of frequency read comparator 140, the output of which is connected to an input of micro controller 80.

Much of the calibrator circuitry just described is similar in implementation to known calibrators. The novel aspects of the invention lie in the interface to the PDA, and the software running on the micro controller, which will now be described.

FIG. 3A is a flow chart showing the operation of the calibrator base software. Flow commences at block 500 when power is first applied to the calibrator base, usually by the attachment of PDA 14 which is detected by the calibrator base.

The micro controller enters an event driven state 510 where it awaits an interrupt generated by an incoming signal from the PDA. When a command is received at block 520, the software verifies that the calibrator hardware has been set up in block 530. If it has not, control reverts to block 510. For convenience, two notes have been labeled A and B respectively. To simplify the drawing, lines connecting these notes have been omitted but they are in fact connected, that is each of the notes labeled A is connected to the other note labeled A, and each of the notes labeled B is connected to the other note labeled B.

If a command is received, the software checks to see if it was a set up command in block 540. If it was, the command is acknowledged in block 550, and the calibrator is powered up, the A-D converters are initialized and the analog switches and digital to analog conditions are initialized.

It should be understood that the hardware portions of the calibrator base other than the portions relating to the PDA, the PDA interfaces, and the hardware and software for communicating with the PDA are substantially similar to known calibrators, and therefore will not be described in detail.

After set up as set forth in block 560 is completed, control reverts to block 510.

After the unit has been set up, flow from block 530 proceeds to block 570, where readings are taken from the analog to digital converter, scaled to the proper engineering units and stored pending request for readings. If the unit is not in the sourcing mode as tested at block 580, the software loops so that new readings are constantly obtained and stored. If the unit is in the sourcing mode, flow proceeds to block 590. The analog to digital converter reading is compared to the desired output setting, and the output digital to analog converter is adjusted to set the source to the desired value. Flow then reverts to block 510.

If a command is other than a set up command, flow proceeds to block 600. If the command is a request for the calibrator ID, flow proceeds to block 610, and the calibrator type, serial number, calibration dates and thermo revision number are transmitted to the PDA. If the command is not a request for calibrator ID information, flow proceeds to block 620. If the calibrator hardware has not been set up, flow proceeds to block 630, an error message is sent to the PDA and flow reverts to block 510. If the calibrator hardware has been set up, the command is tested at block 640. If the command is a calibrator status command, the controller sends the calibrator status flags to the PDA for display as shown in box 650, whereupon flow reverts to block 510. If the command is not a calibrator status command, it is tested at block 660. If the command is a source of value command, flow proceeds to block 670, the command is acknowledged to the PDA and the new output source setting is saved in a register. Flow then proceeds to block 590, where the analog to digital converter reading is compared to the stored source output setting and flow proceeds as already described.

If the command is not a source value command, it is tested again at block 680. If the command is a read command, the last stored value from block 570 is sent to the PDA as shown in block 690, and flow reverts to block 510. If the command is not a read command, flow proceeds to block 700. If the command is a calibrate command, the software tests whether a calibration jumper is installed at block 710, and if it is, the command is acknowledged to the PDA, the analog to digital converter input is rescaled based on the current reading, and flow reverts to block 10. If the calibration jumper is not installed, the unit is not set to calibrations and an error message is returned at block 720, 730 and flow reverts to block 510.

Figure 4:
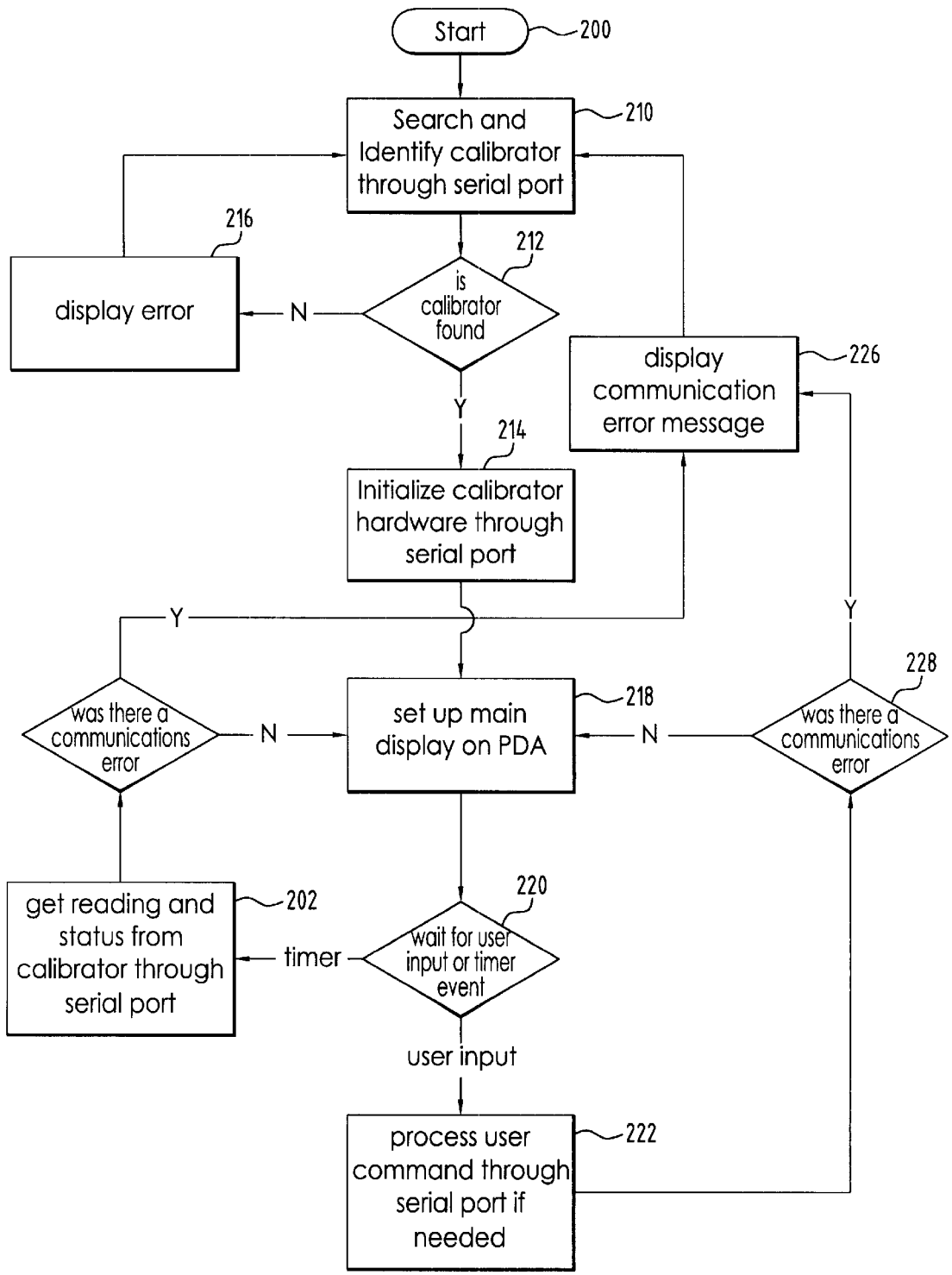
FIG. 4 is a flow chart showing the set up function of the PDA calibrator, which can operate on the PDA or on a host computer.

FIG. 4 is a flow chart showing the manner in which the software in the PDA interacts with the calibrator base and the manner in which the PDA can be used to create new instrument records in a data base stored in the PDA and transferable to a host computer.

Heretofore, instrument records, that is records that include the identity of the instrument to be calibrated and the calibration steps that must be taken to calibrate the instrument were created in host computers and down loaded to documenting calibrators. Documenting calibrators heretofore known did not have the capability to add an instrument in the field, and therefore if a calibration record for an instrument was not present on the documenting calibrator, the calibration could not be carried out. In such a case it was necessary to create a new calibration record in the host computer and download the calibration record to the documenting calibrator before calibration could be made. This invention provides for the creation of instrument and calibrator records in the field on the PDA, and for the transfer of the instrument and calibrator records to another computer that maintains a long term data base.

Figures 4M, 4N, 4O, 4P:
FIGS. 4A–T are drawings of the graphical user interface of the PDA showing the display at it appears at various stages of the software shown in FIG. 4.
Figures 4Q, 4R, 4S, 4T:
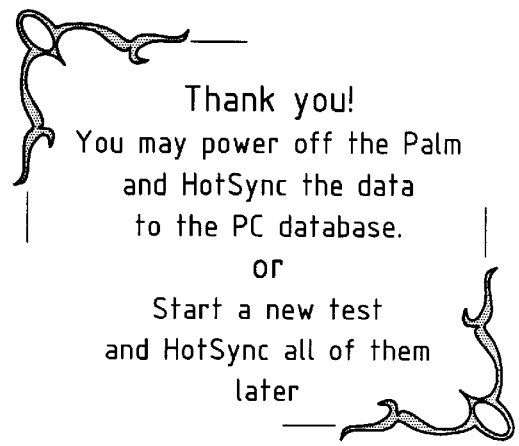
Figure 5A:
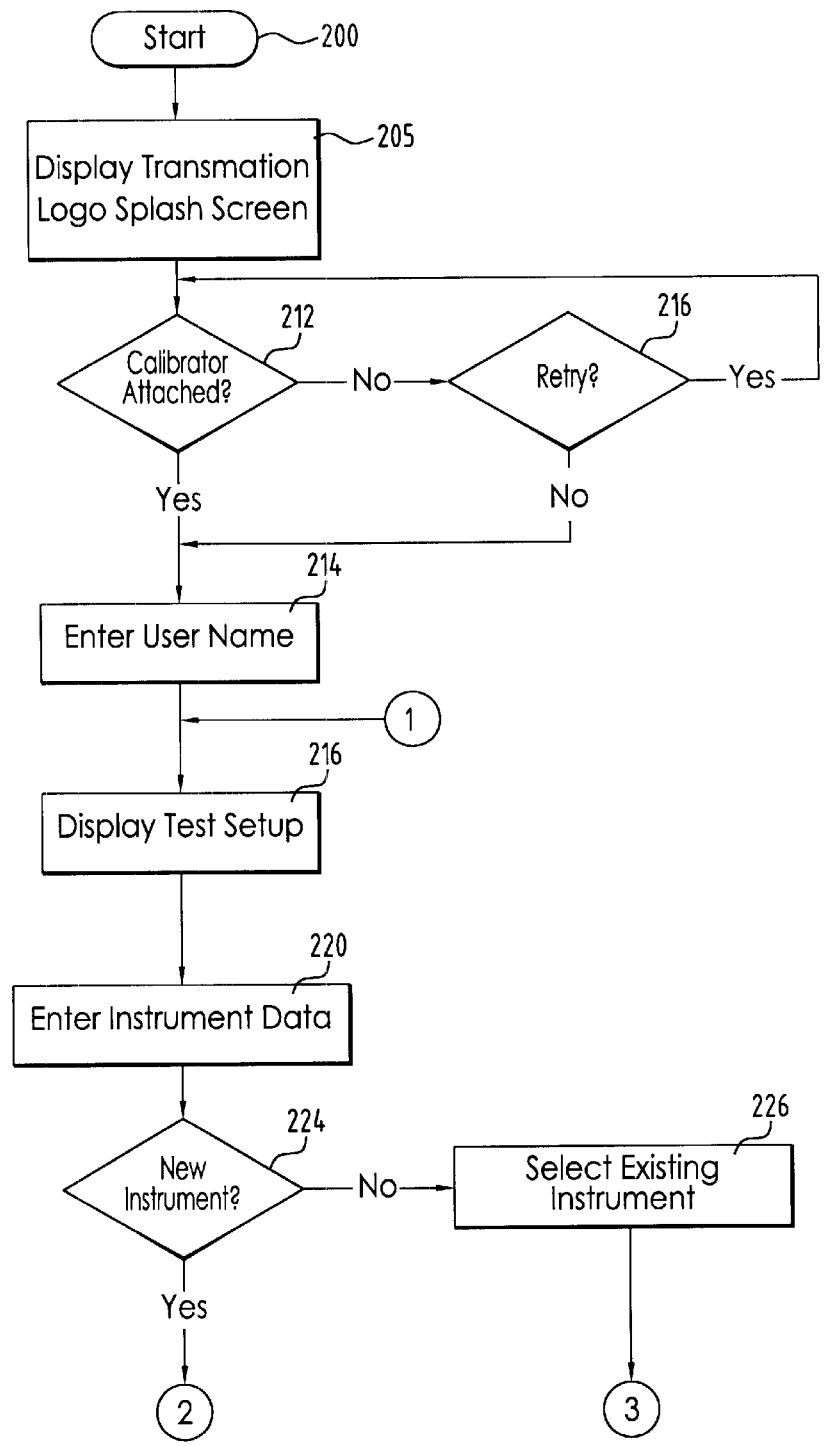
FIGS. 5A–D are flow charts showing the operation of the PDA portion of the PDA calibrator.
Figure 5B:
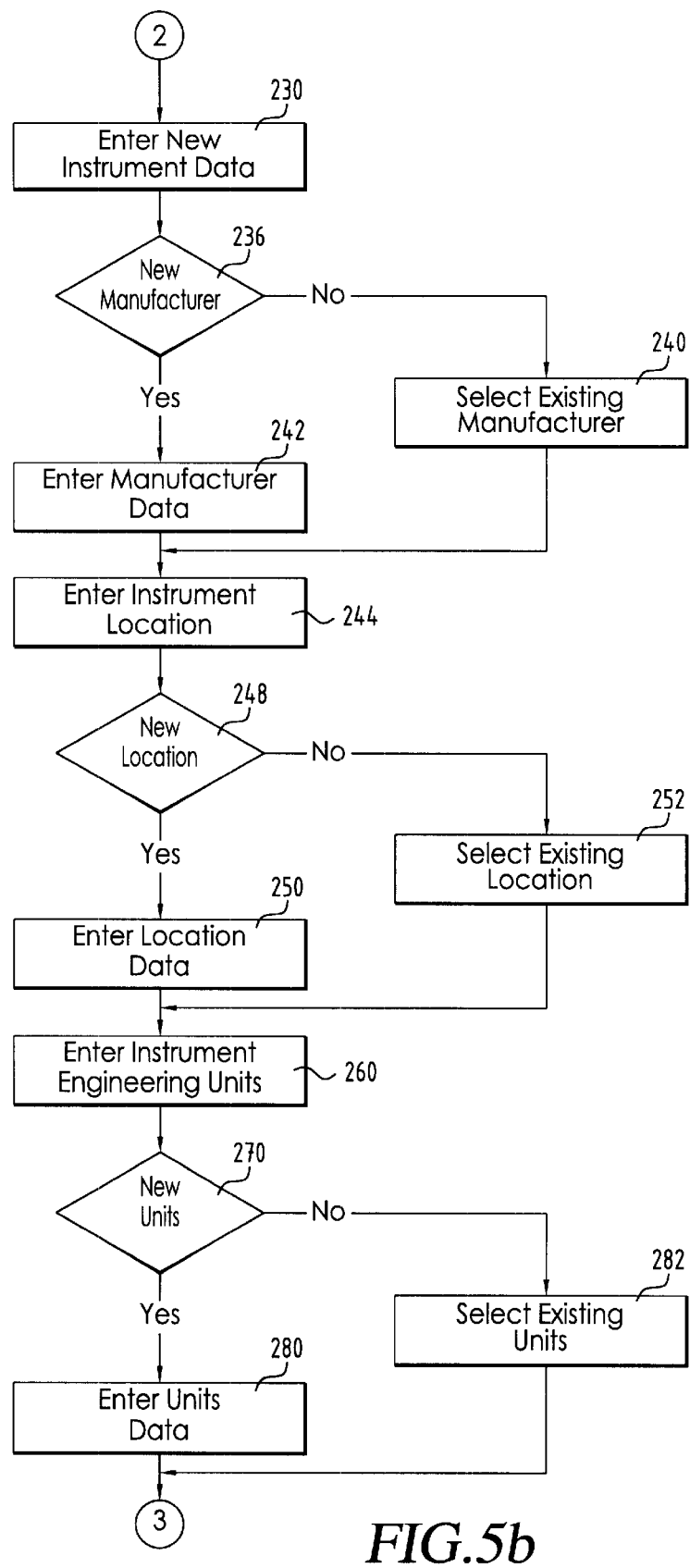
Figure 5C:
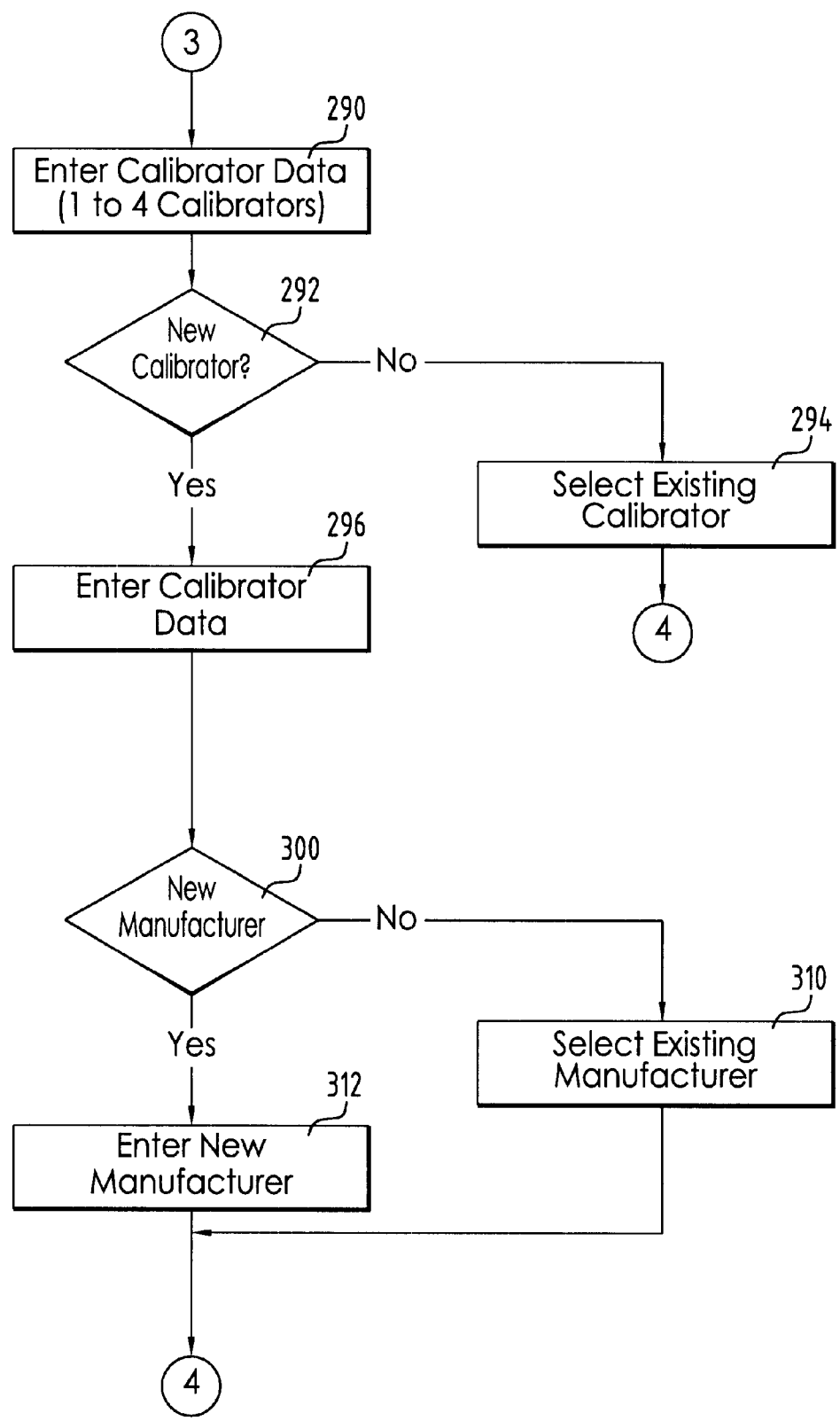
Figure 5D:
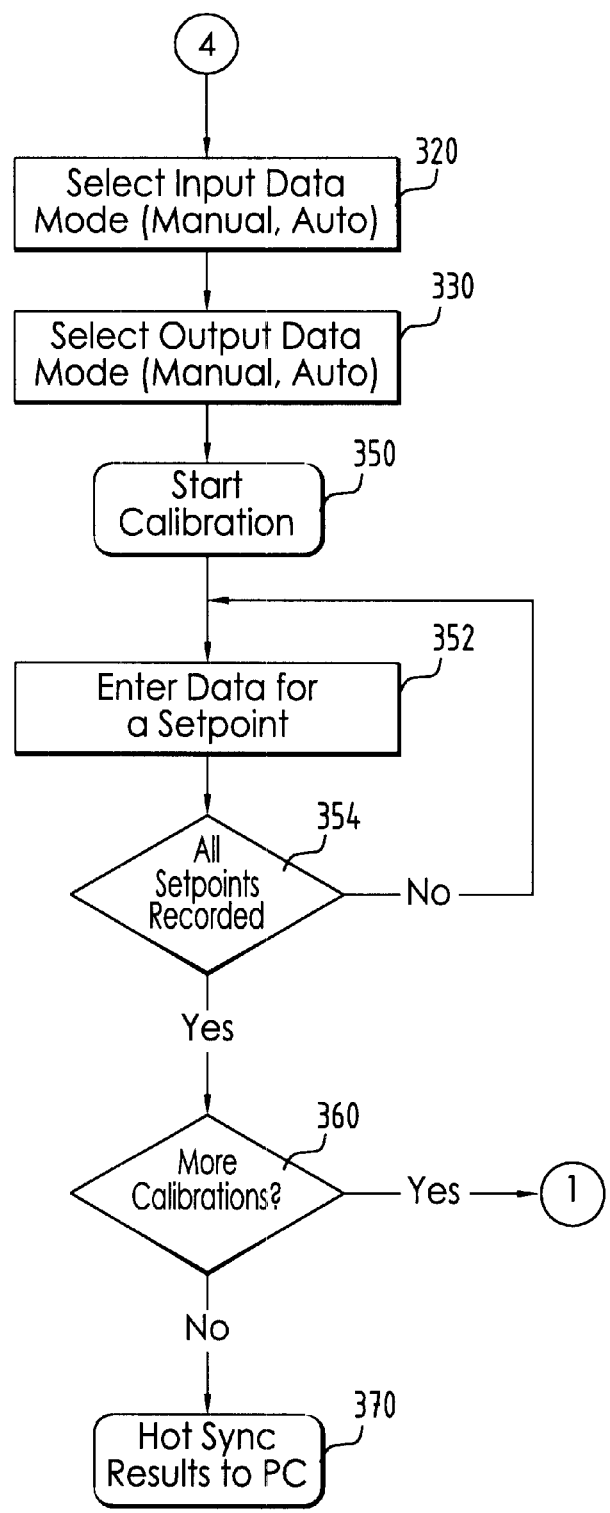

FIGS. 4A–T are drawings of the graphical user interface of the PDA showing the display at it appears at various stages of the software shown in FIG. 4.

When the software is first started, flow begins at block 200. A splash screen is displayed at block 205. A drawing of the splash screen appears at FIG. 4A. The PDA generates a signal at block 212 transmitted through serial bus adapter 82 to the micro controller to receive data identifying the calibrator. In this way, software operating on the PDA can be used, without modification, with a variety of calibrators, for example voltage calibrators, current calibrators, thermo couple calibrators and the like. If a response is received, flow proceeds to block 214, and the user is prompted to enter a user name or ID.

The calibrator detection routine is repeated a fixed number of times if no response is received, as shown at block 216. If the preset number of retries has not been exceeded, flow reverts to block 212 and the query is resent. Once the preset number of retries has been exceeded, flow proceeds to block 214 and the software records that no calibrator is attached.

Once the user has entered a valid user name, flow proceeds to block 216, and the test set up screen shown in FIG. 4B is displayed. The set up screen includes fields for entering an instrument to be calibrated, and a plurality of calibrators to be used in the calibration. The screen also includes fields for selecting manual or automatic input modes as shown in FIG. 4D. Manual and auto input can be selected. The test set up screen also permits the output entry mode to be entered. As shown in FIG. 4D, auto output and auto pressure can be selected.

A virtual button 217 selects screen 4C where additional information relating to temperature, relative humidity and barometric pressure may be entered, along with a free form description of the calibration procedure. Button 218 returns to the FIG. 4B screen.

The instrument field may be completed by entering instrument data at block 220. An instrument may be also selected from known instruments stored in a database on the PDA, as shown in FIG. 4E. Alternately, a new instrument may be added by selecting button 222 at block 224. If a new instrument is to be entered, flow proceeds to block 230. If an existing instrument is selected, flow proceeds to block 226. If a new instrument is to be entered, block 230 brings up screen 4F where fields are presented for entering the instrument tag number, a loop designation, the instrument model number and serial number, the instrument manufacturer and the location of the instrument. If the user elects to choose a manufacturer already stored in the data base at block 236, flow proceeds to block 240 and the screen shown in FIG. 4N is brought up. If the user elects to enter data on a new manufacturer, at block 242, the screen shown in FIG. 4O is brought up and a field is presented for the user to enter the manufacturer's name.

Once the manufacturer has been either selected or entered, flow proceeds to block 244, where the instrument location is entered in the screen shown at FIG. 4P. Either an existing location can be selected from a list presented to the user, or, by pressing button 246 at block 248, a new location screen as shown in FIG. 4Q is presented at block 250. If an existing location is selected at block 252, flow proceeds to block 260. If new location data is entered on the screen shown in FIG. 4Q, the user presses the OK button 256 and flow proceeds to block 260.

At block 260, the instrument engineering units are entered. Referring back to FIG. 4F, once the instrument identifying information is entered, a forward button 262 can be pressed, to bring up the screen shown in FIG. 4G, where fields are presented for the user to enter the last calibration date for the instrument, the next calibration due date, and the calibration interval. A free form description of the calibration procedure can also be entered. Forward button 264 and back button 266 move the user to the screens shown in FIGS. 4H and 4F respectively. Referring now to FIG. 4F, the input and output engineering unit data for the instrument can be entered. The user has the choice of entering new units or selecting from stored units at block 270. If the user elects to enter stored units, FIG. 4I shows a menu from which milliamps and ohms can be selected. The user can also elect to add new units, in which case flow proceeds to block 280, and the user can add the appropriate engineering unit, which then appear on the menu shown in FIG. 4I. The engineering units for the output data are selected in the same way, as shown in FIG. 4J. The engineering units for the error field are selected from a menu as shown in FIG. 4H. Once the user has either entered desired engineering units or selected existing engineering units in block 282, flow proceeds to block 290, where calibrator data is entered in the screen shown at FIG. 4M. Fields are presented for the user to select the manufacturer, the model number, and the serial number. The last calibration date is retrieved from the data base stored in the PDA if available, or entered manually. The calibration due date is also retrieved or entered, as is the calibration interval. A field for entering free form information about the calibrator is also presented to the user as shown in FIG. 4M.

If the user elects to add a new calibrator at block 292, he/she can either select a new calibrator at block 294 from the screen display shown at FIG. 4L, or enter new calibrator data at block 296. If the user elects to add a new calibrator by pressing the add new button 298, as shown in FIG. 4L, flow proceeds to block 300 and the display shown in FIG. 4N is presented for the user to pick an existing manufacturer, or select the menu entry add new manufacturer, whereupon flow proceeds to block 310, and the display shown in FIG. 4O is presented for the user to enter the manufacturer's name at block 312. Once the user has either selected an existing manufacturer or added a new manufacturer, flow proceeds to block 320, where the input data mode is selected, as already discussed, whereupon flow proceeds to block 330, where the output data mode is selected. The input and output data mode selections are made on the screen shown in FIG. 4D. Once the test set up is complete, the user selects the start button 346 on either of the screens shown in FIGS. 4B or 4C, and the calibration procedure is started at block 350. The user is prompted at block 352 to enter data for a set point or expected input on the screen shown in FIG. 4R. The screen includes fields for entering expected input, expected output, and error limit. The software loops through block 354 and block 352 until all the set points are recorded. If the PDA is being operated in a stand alone mode, the actual input and actual output are recorded manually. If the PDA is connected to a calibration base, the actual input and actual output are measured by the calibration base, and the data is sent to the PDA and displayed in the appropriate fields in FIG. 4R.

As shown in FIG. 4S, the user then selects data type, either as found or as left, depending on whether the instrument was adjusted based on the results of the calibration.

Flow then proceeds to block 360, where the user can elect to make more calibrations, or to end the calibration process, in which case flow ends at block 370, where a screen 4T is displayed prompting the user to transfer the stored data to a host PC.

The PDA calibrator in accordance with this invention is preferably used in combination with a calibration data base, preferably a data base operating on a stand alone computer. A plurality of PDA calibrators can be used by calibration technicians to simultaneously calibrate a large number of instruments or process devices.

The calibration software running on the central computer preferably provides the facilities to carry out the entry of instruments, calibration procedures, calibrators and other calibration information in the data base. After the information is entered into the computer, a hot sync or data transfer operation is performed to transfer the information to the PDA.

The PDAs are disconnected from the computer and connected to the calibrator base, and the assembled PDA calibrator is used to calibrate instruments or processes in the field. The results of the calibrations are stored on the PDA, and can be viewed by the calibration technician as necessary.

Once all required calibrations have been completed, the PDA is removed from the calibration base, connected to the computer and a second hot sync operation is performed to transfer the calibration results to the computer, where they are saved in a calibration history table.

FIG. 6 is a list of tables that exist on the PDA (referred to for convenience as PALM, the host computer, referred to for convenience as PC, and an indication of whether the data in the table is hot sync or replicated from the PDA to the computer and vice versa.

FIGS. 7 through 17. The calibration history info table includes the same data as the calibration results table and in addition, each record has an auto number key. Whenever there is an index reference, the record will be related to the referenced record, for example the instrument index plus all the fields in the instrument table, etc.

Similarly, the calibration history data table includes the same data as the calibration results table, plus an auto number key for each reference. Whenever there is an index reference, the record will be related to the referenced record.

Figure 18:
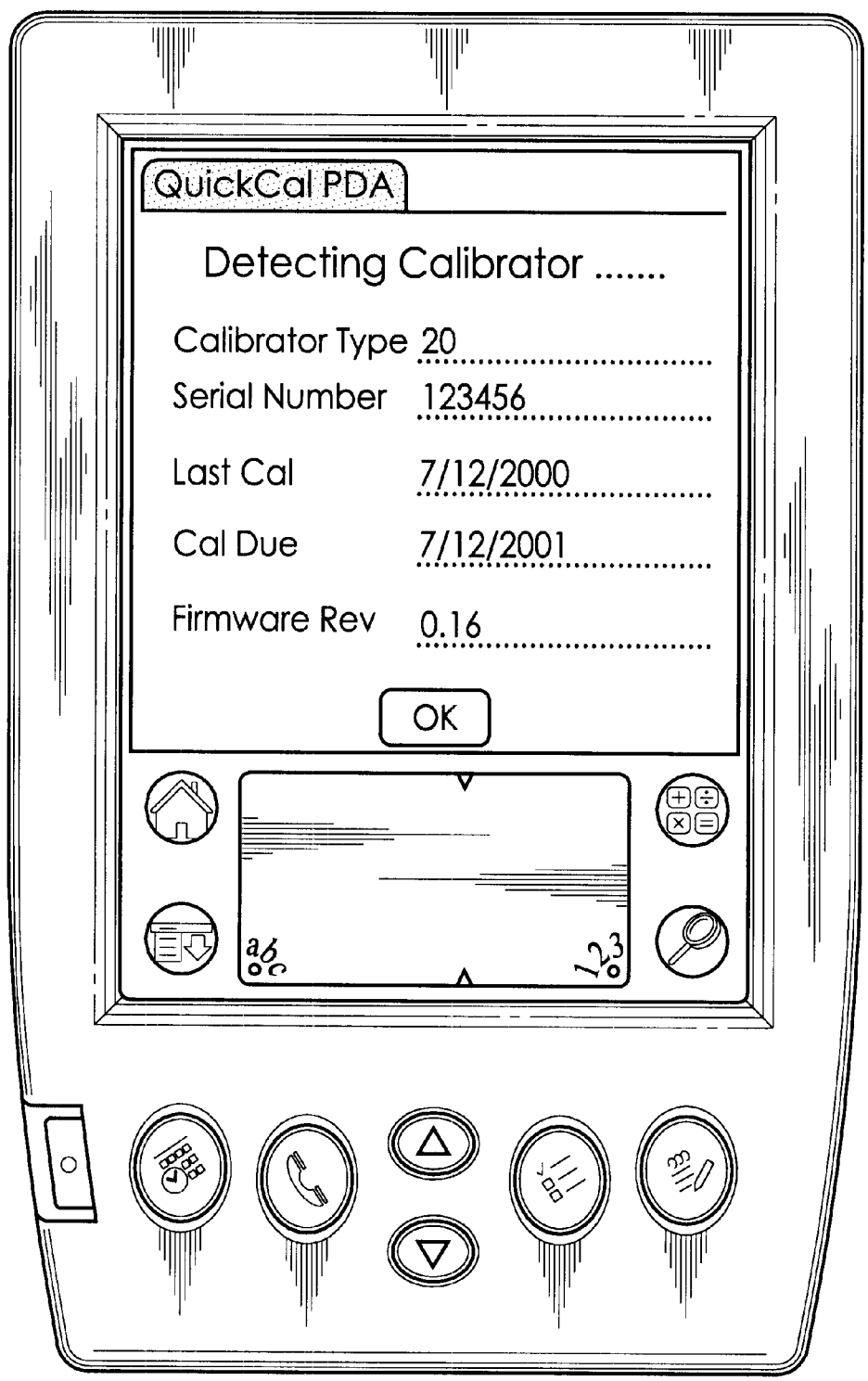
FIG. 18 is a drawing of the screen display showing the calibrator information detecting step.

FIG. 18 shows the display of the PDA when presenting information to the user after carrying out the steps set forth in block 210 of FIG. 4. The display indicates the calibrator type, the serial number of the calibrator, the date the calibrator was last calibrated, the date the calibrator is due for calibration and the firm ware revision of the calibrator.

Figure 19:
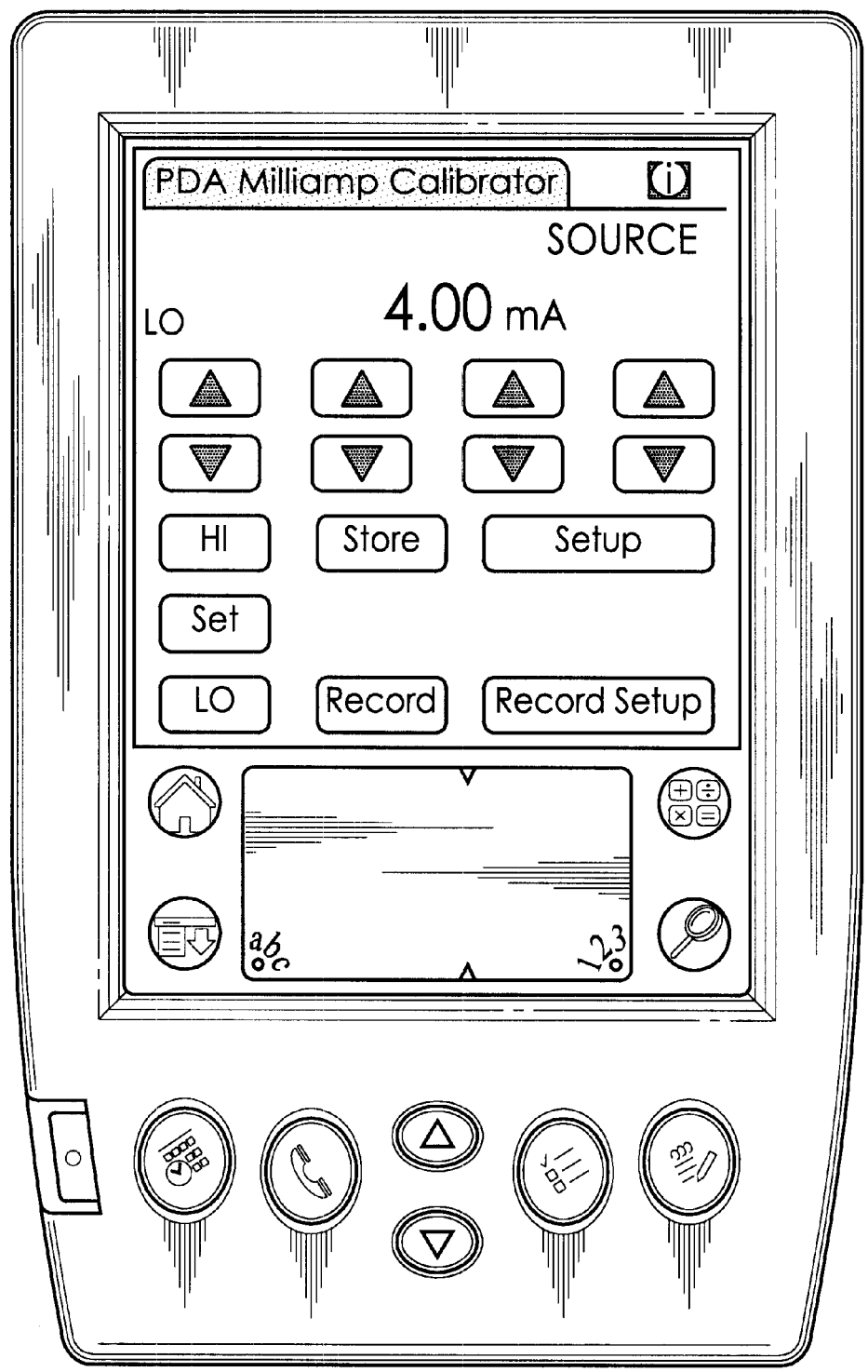
FIG. 19 is a copy of the screen display showing the low value sourcing operation.
Figure 20:
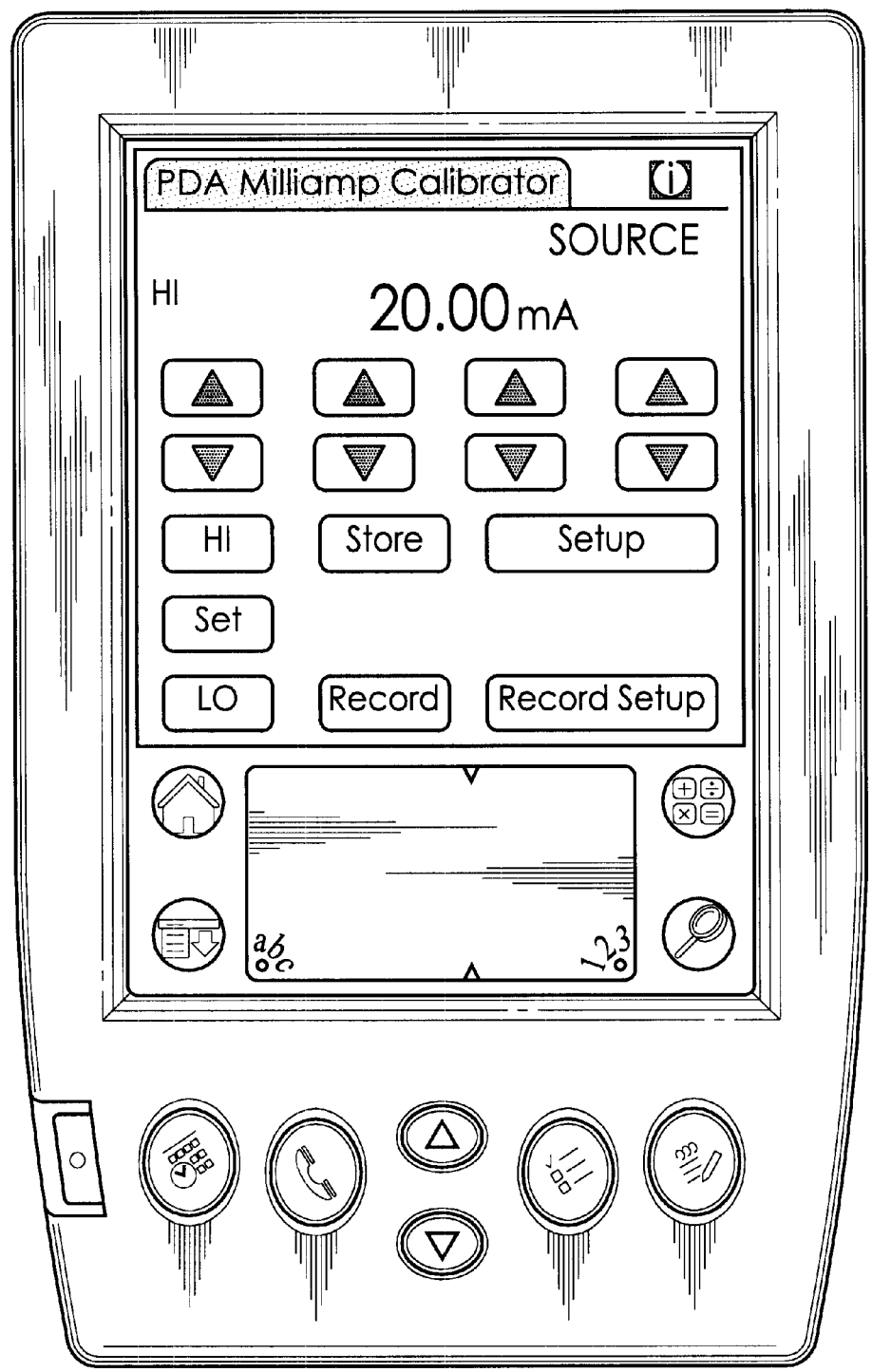
FIG. 20 is drawing of the screen display showing a high value sourcing operation.
Figure 21:
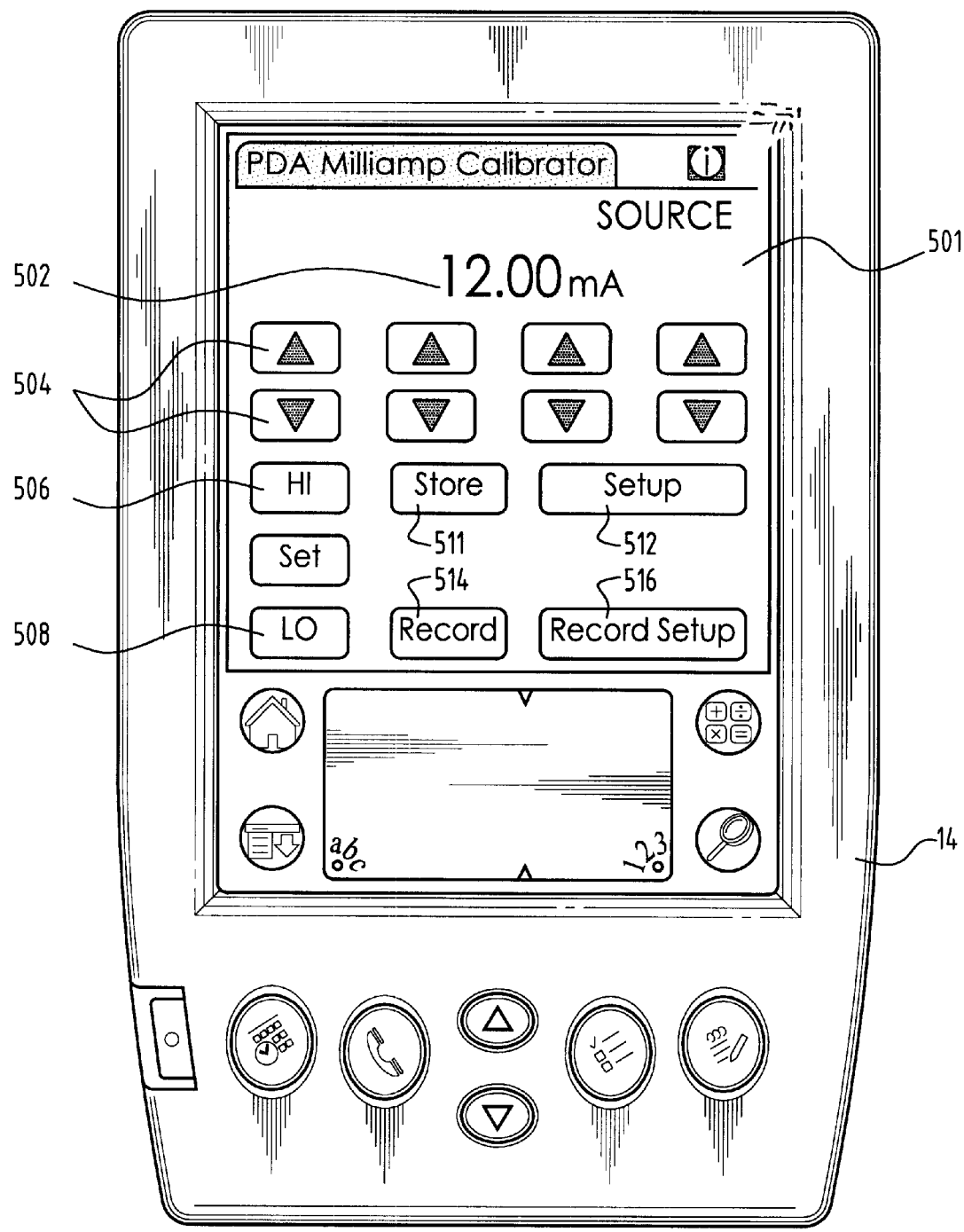
FIG. 21 is a diagram of the screen display showing the variable value sourcing operation.

FIGS. 19 through 21 show the calibrator acting as a milliamp card source. FIG. 19 shows the PDA calibrator providing a 4.00 milliamp low signal to an instrument or device.

FIG. 20 shows the PDA calibrator providing a 20.00 milliamp (high) signal to an instrument or process device and FIG. 21 shows the PDA calibrator providing a 12.00 milliamp intermediate level to an instrument or process device.

Referring to FIG. 21, the touch screen 501 of PDA 14 includes a number of graphical user interface elements. The magnitude of the source current is indicated numerically at 502 as a four digit number to two decimal places. Four sets of up/down graphical buttons 504 allow the user to adjust the current by modifying each of the four digits displayed.

For convenience, HI button 506 sets the source to the 20 milliamp high level and LO button 508 sets the milliamp source to a 4.00 milliamp low level.

The graphical user interface also includes a store button 511, a set up button 512, a record button 514, and a record set up button 516.

Figure 22:
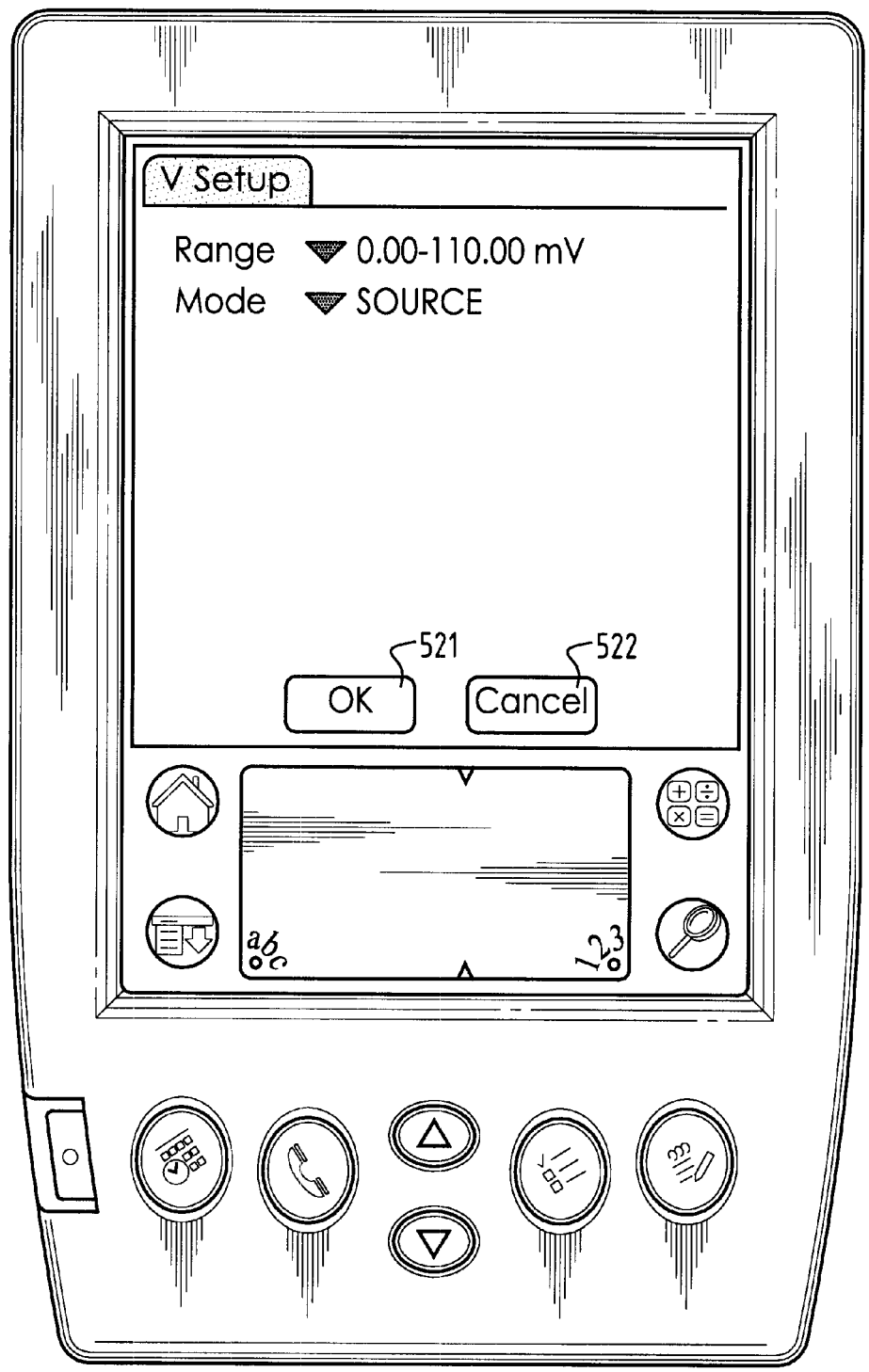
FIG. 22 is a drawing of the screen display showing the voltage set up function.

FIG. 22 shows the user interface for the voltage set up function. The screen permits the user to set the range of voltages and the mode of the PDA calibrator. Each of the range and mode selections is accessible through a drop down menu. Once the desired range and mode have been sent, the user presses the virtual button 521 to save the selection, or cancel button 522 to cancel the change.

Figure 23:
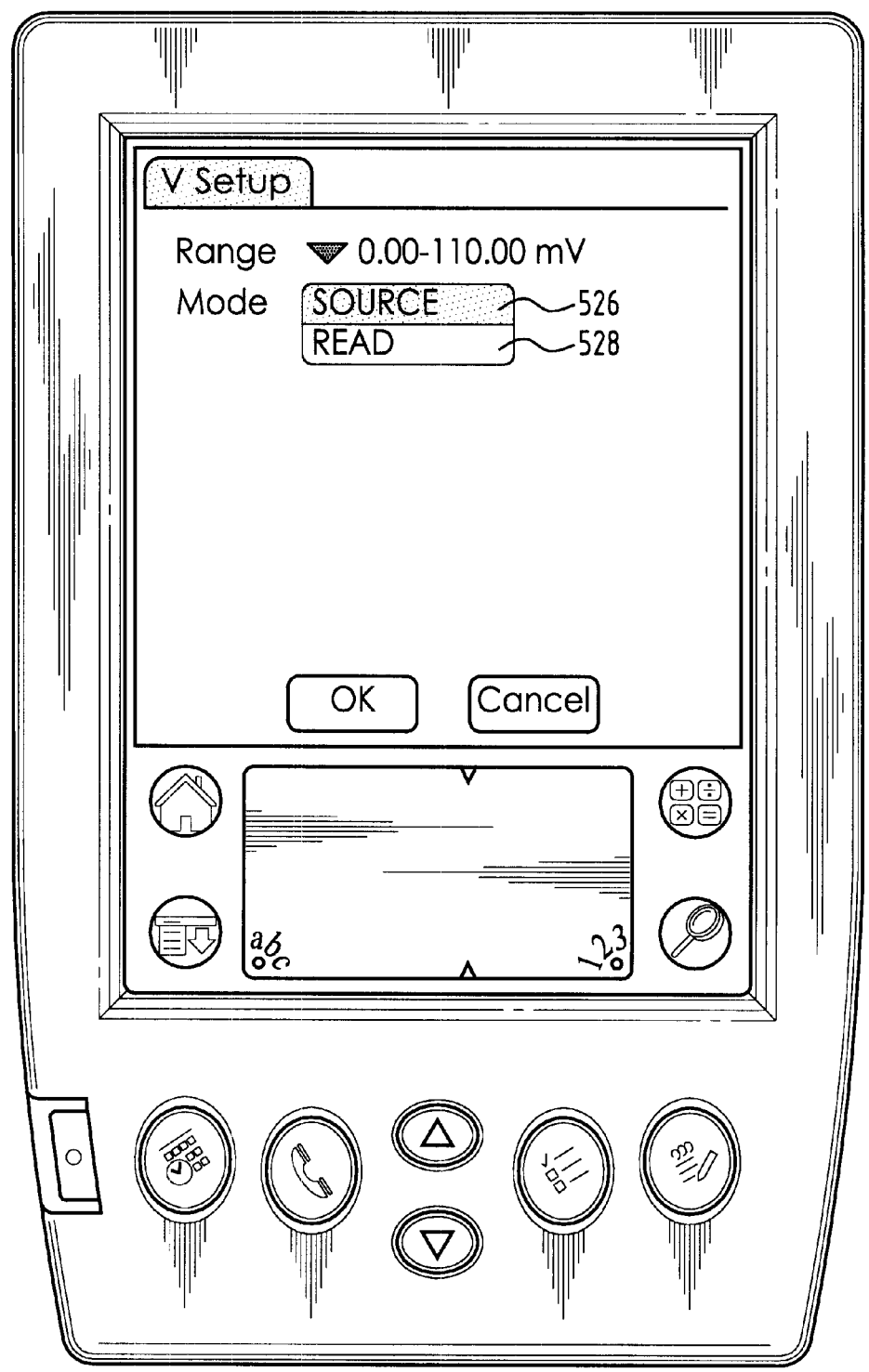
FIG. 23 is a drawing of the screen display showing the mode selection operation of the voltage set up procedure.
Figure 24:
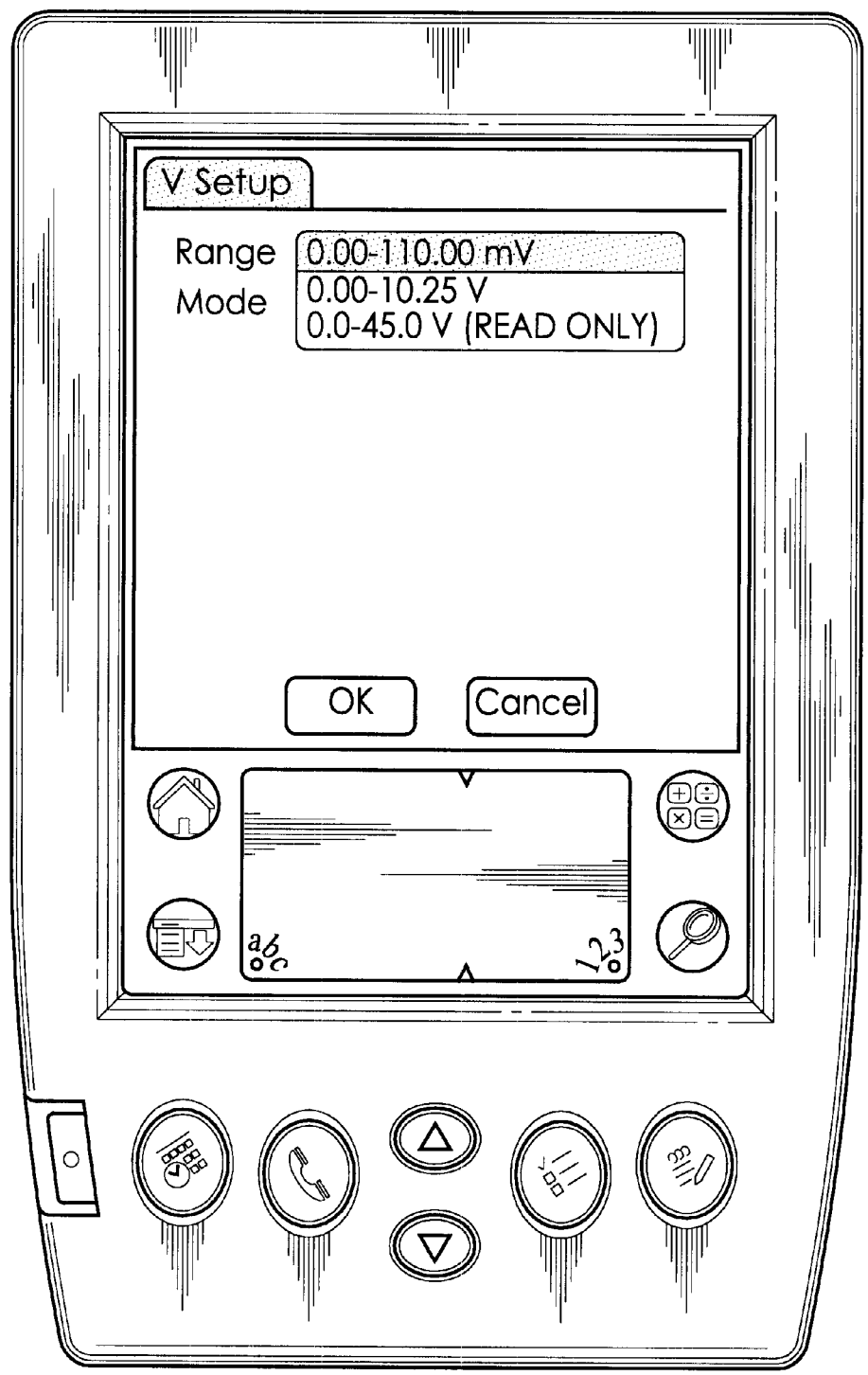
FIG. 24 is a drawing showing the screen display of the range set up operation of the voltage set up procedure.

FIG. 23 shows the mode drop down menu from which the source mode 526 or the read mode 528 can be selected. FIG. 24 shows the drop down range selection menu from which the following ranges can be selected:

0.00–110.00 mV, 0.00–10.25V and 0.0–45.0V (read only).

The okay and cancel buttons act as already described.

Figure 25:
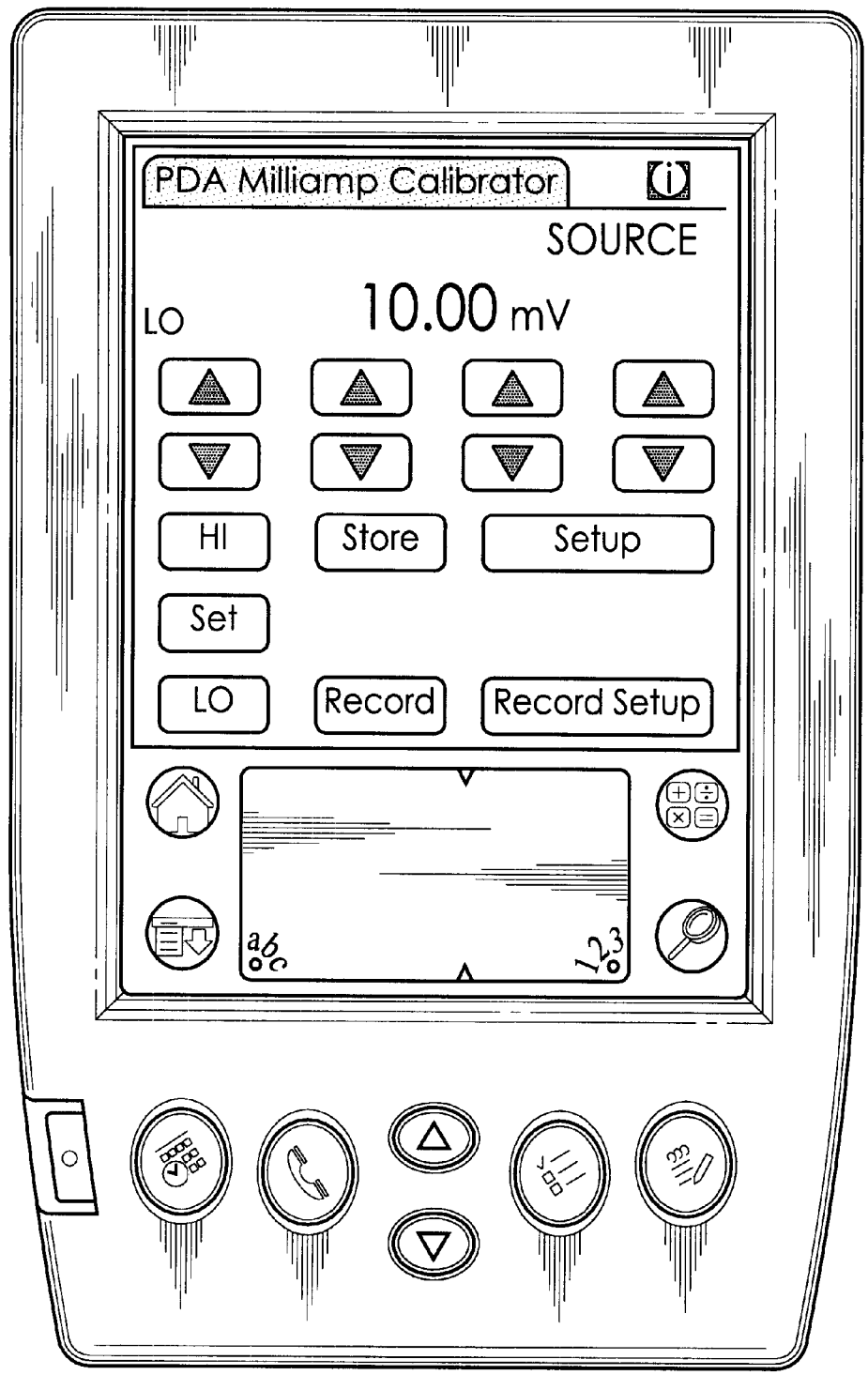
FIG. 25 is a drawing showing the screen display of the low voltage sourcing procedure.
Figure 26:
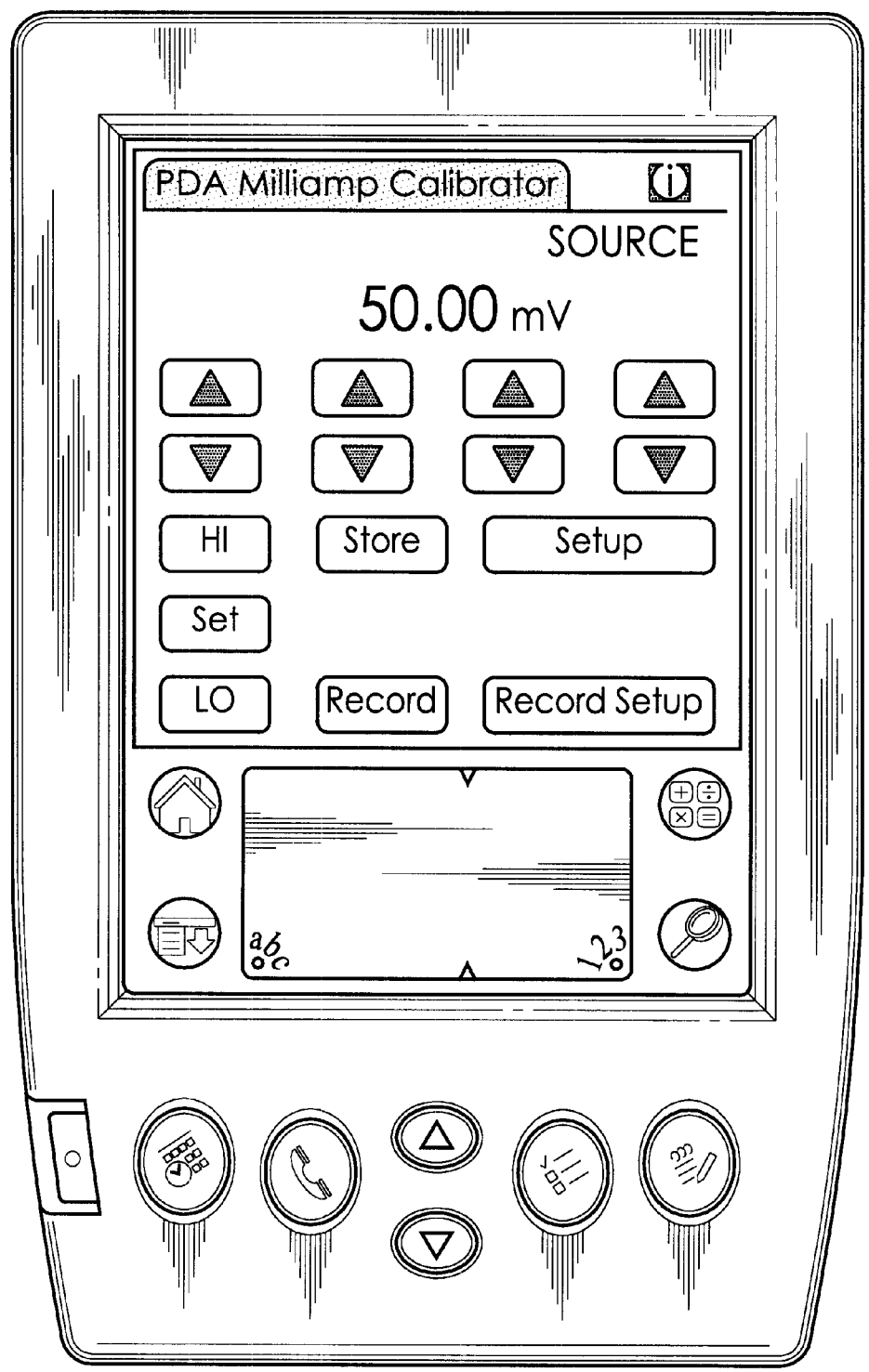
FIG. 26 is a screen display showing the variable voltage sourcing procedure.
Figure 27:
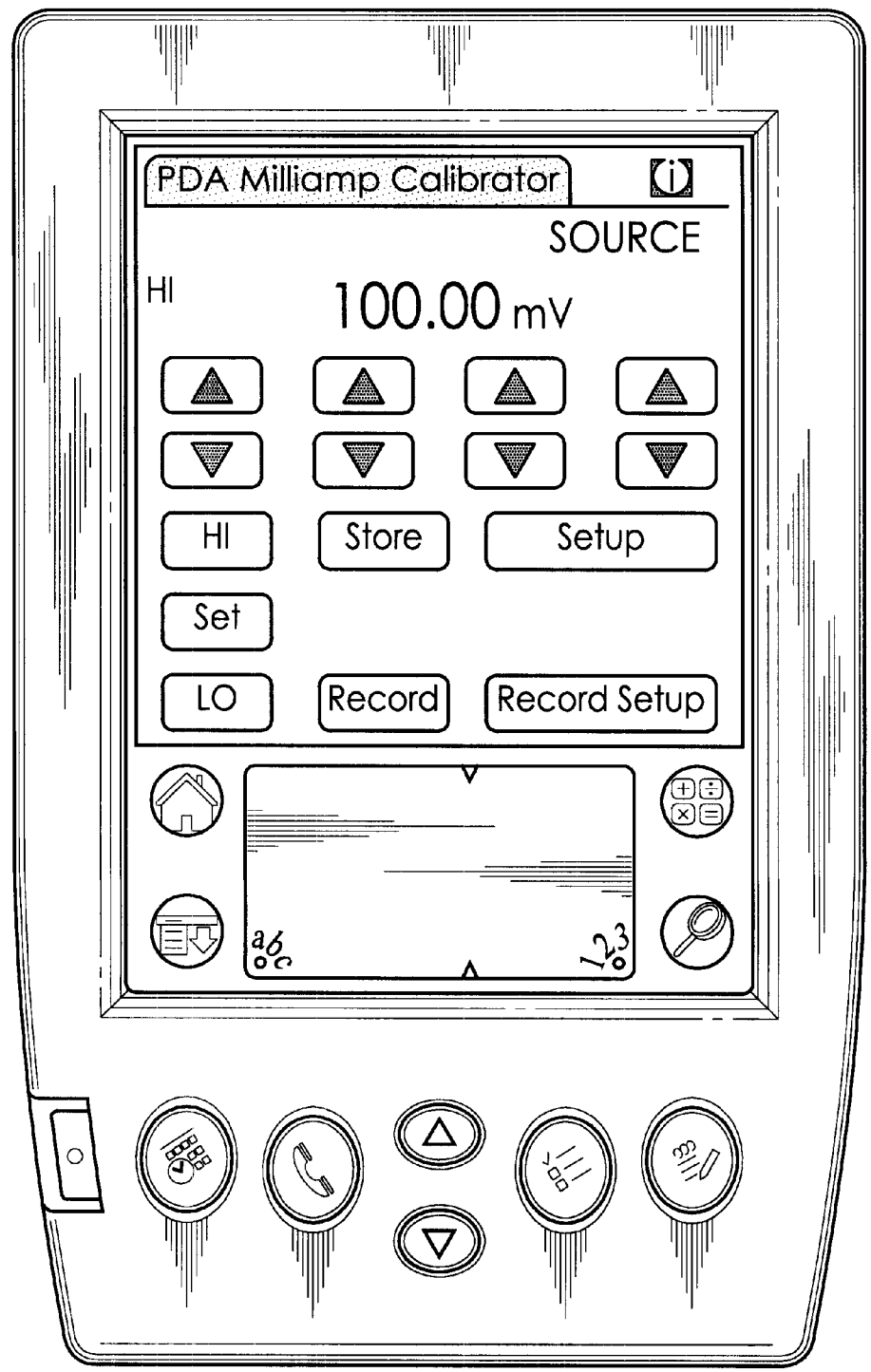
FIG. 27 is a screen display of the high voltage sourcing procedure.

FIGS. 25–27 show the PDA calibrator acting as a voltage source, providing a 10–100 mV calibration signal. The voltage source operation of the PDA calibrator is substantially identical to the operation of the calibrator of the current source as already described in connection with FIGS. 19–21.

Figure 28:
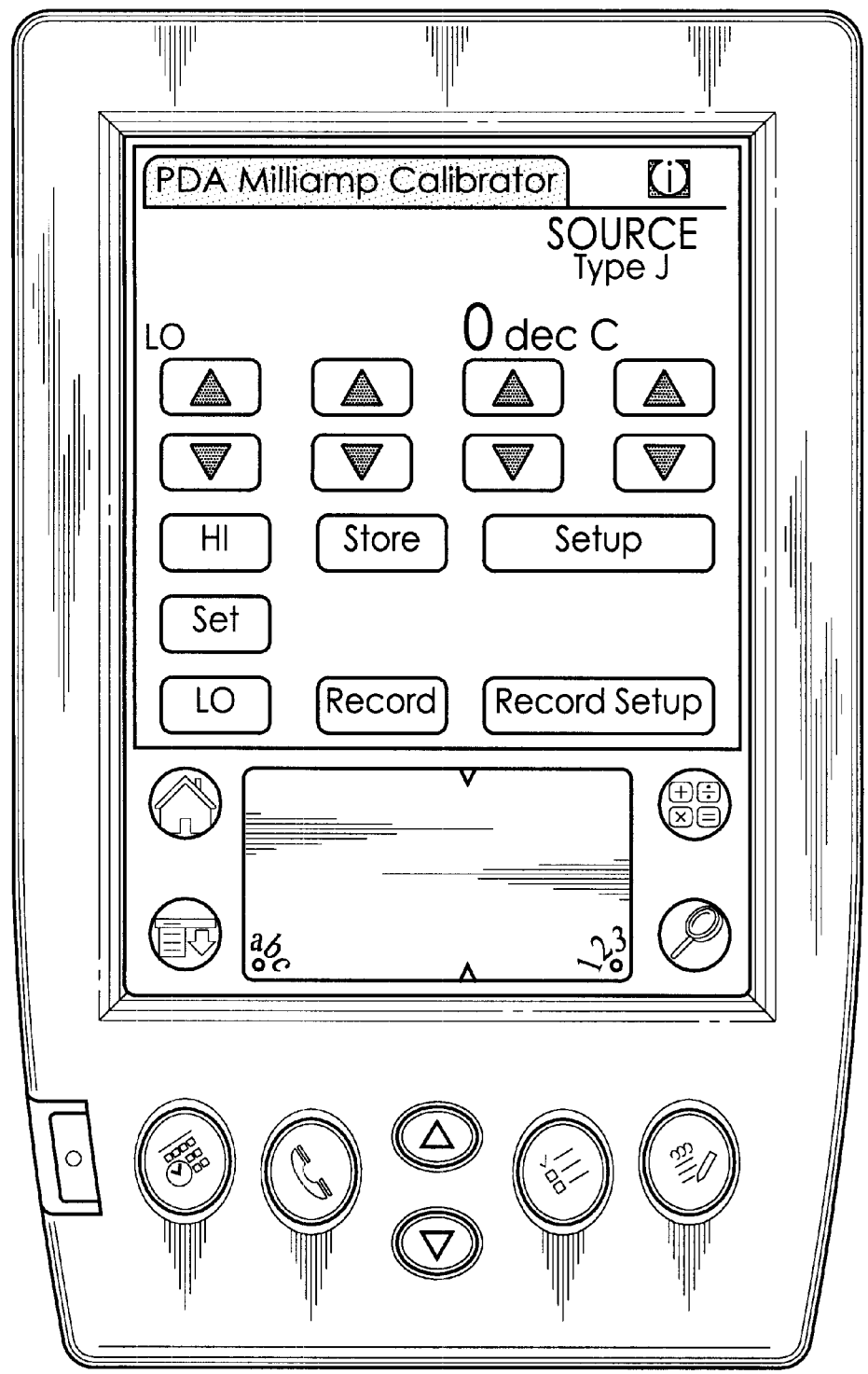
FIG. 28 is a screen display showing the low value type J thermo couple sourcing procedure.
Figure 29:
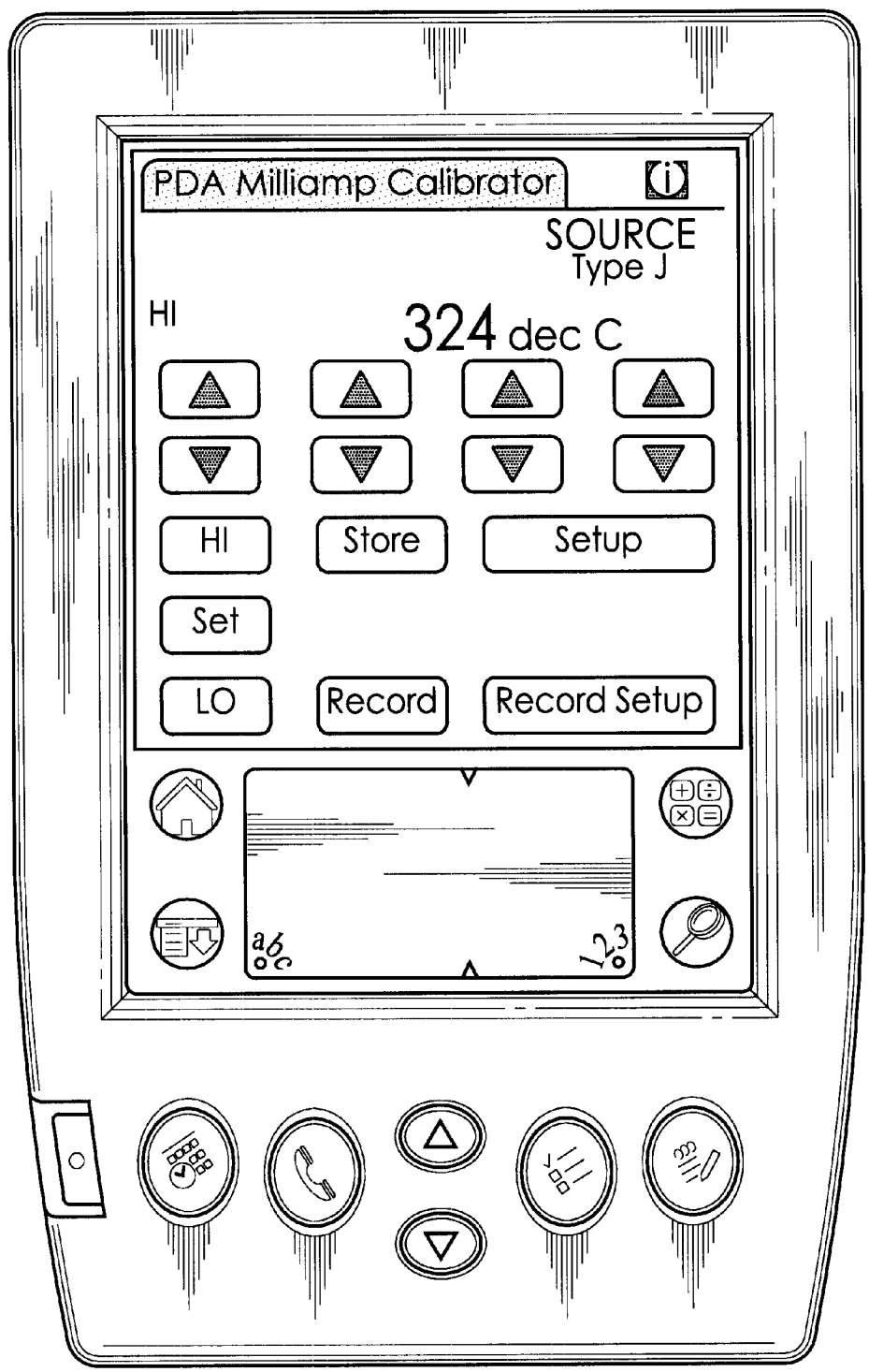
FIG. 29 is a screen display showing the high value J type thermo couple sourcing procedure.
Figure 30:
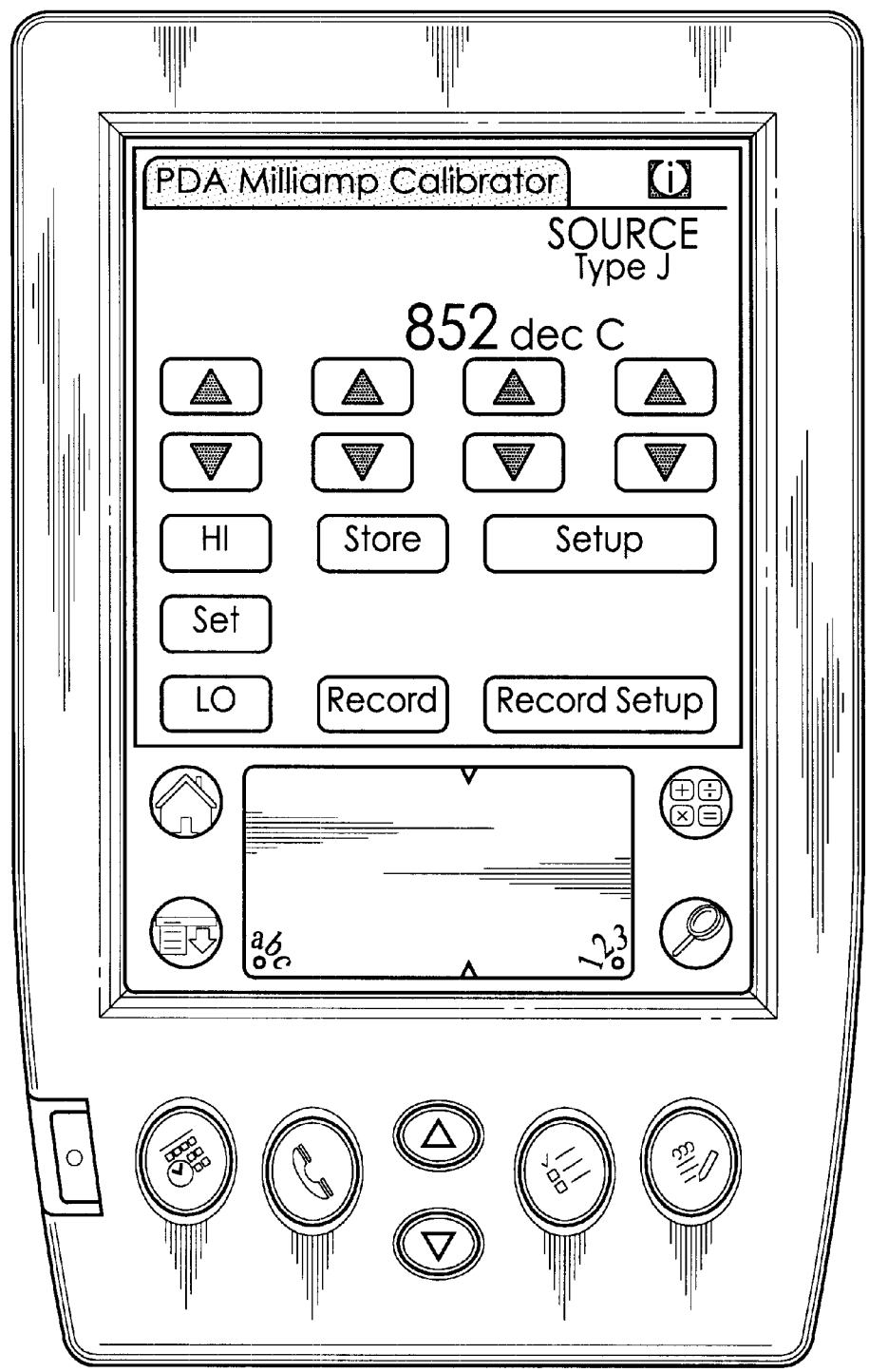
FIG. 30 is a drawing showing the screen display of the variable type J thermo couple sourcing procedure.

FIGS. 28–30 show the PDA calibrator acting as a thermo couple source. The operation of the calibrator in the thermo couple source mode is substantially identical to the current and temperature modes as already described, except that the maximum and minimum values are –013.6 degrees F. min and 486.0 degrees F. max.

Figure 31:
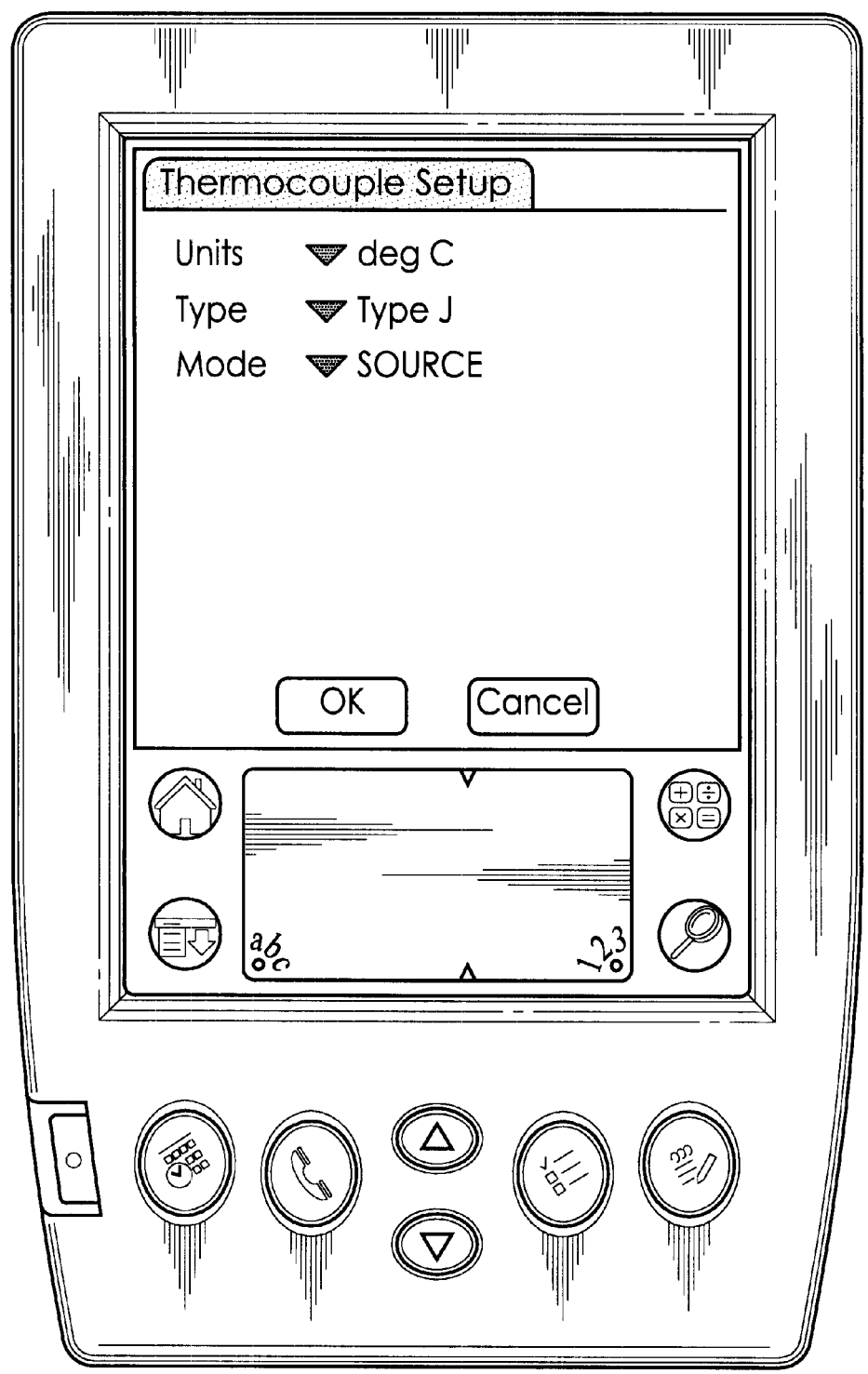
FIG. 31 is a drawing showing the thermo couple set up screen display.
Figure 32:
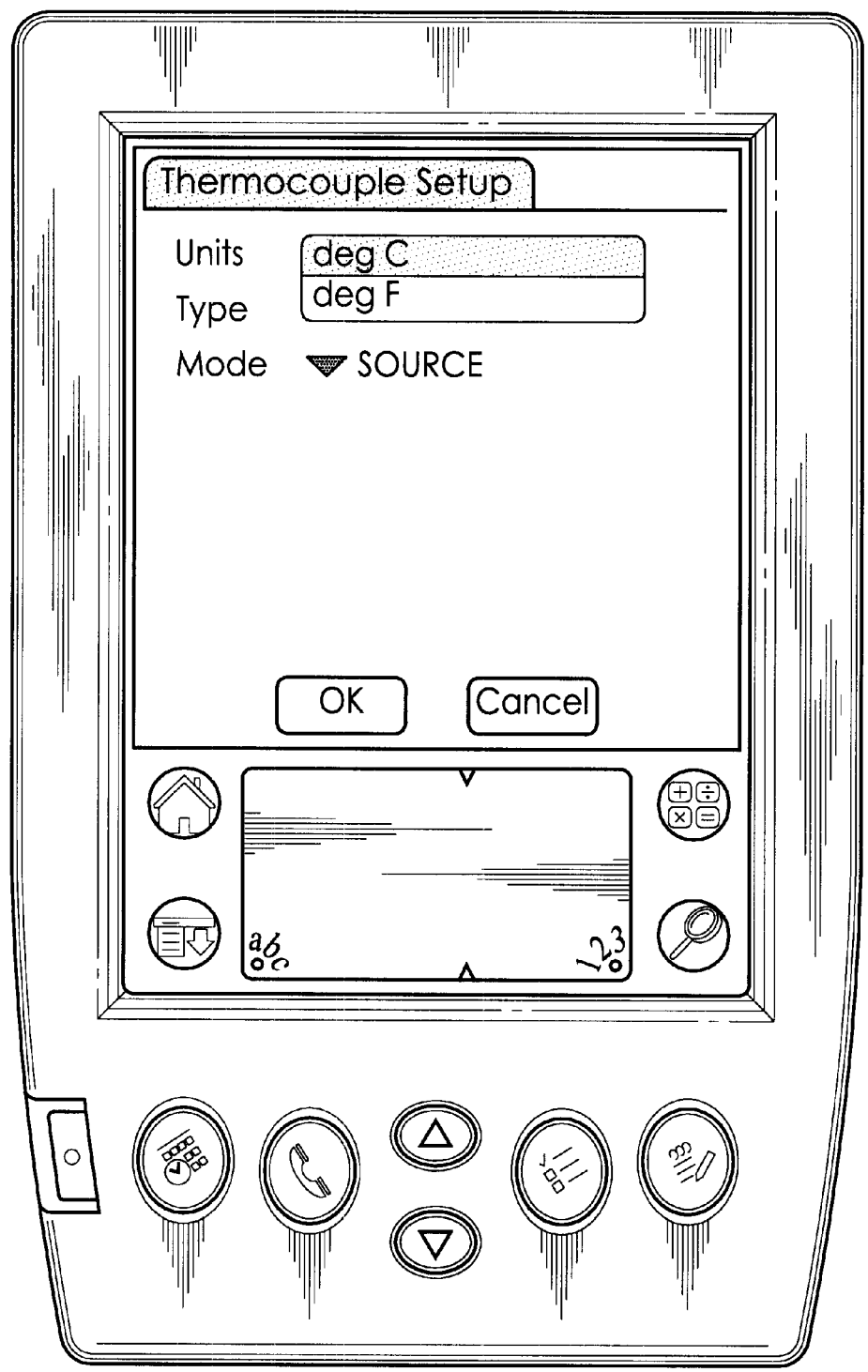
FIG. 32 is a drawing showing the selection of units in the thermo couple set up procedure.
Figure 33:
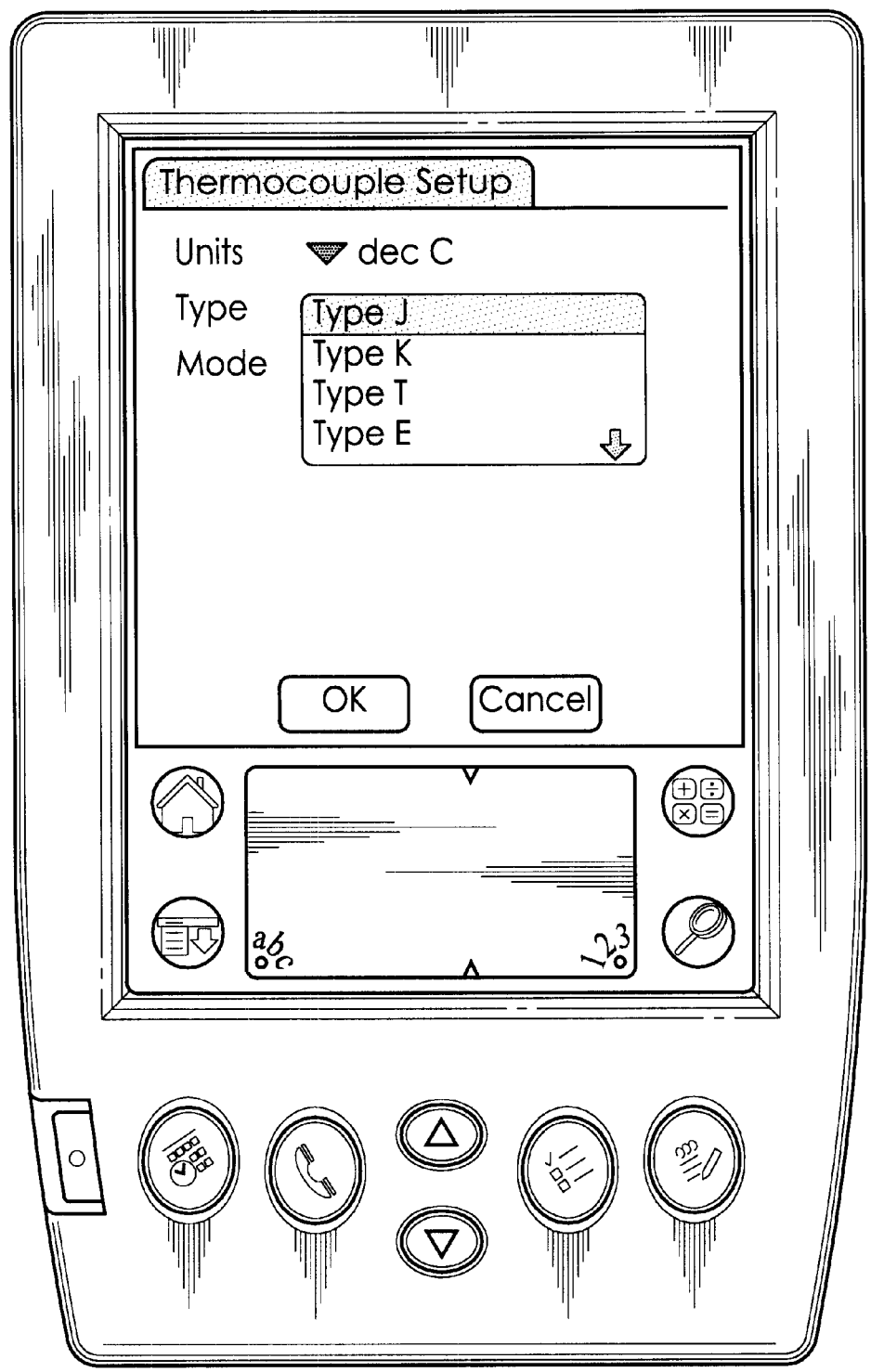
FIG. 33 is a drawing of the screen display showing the selection of thermo couple type in the thermo couple set up procedure.
Figure 34:
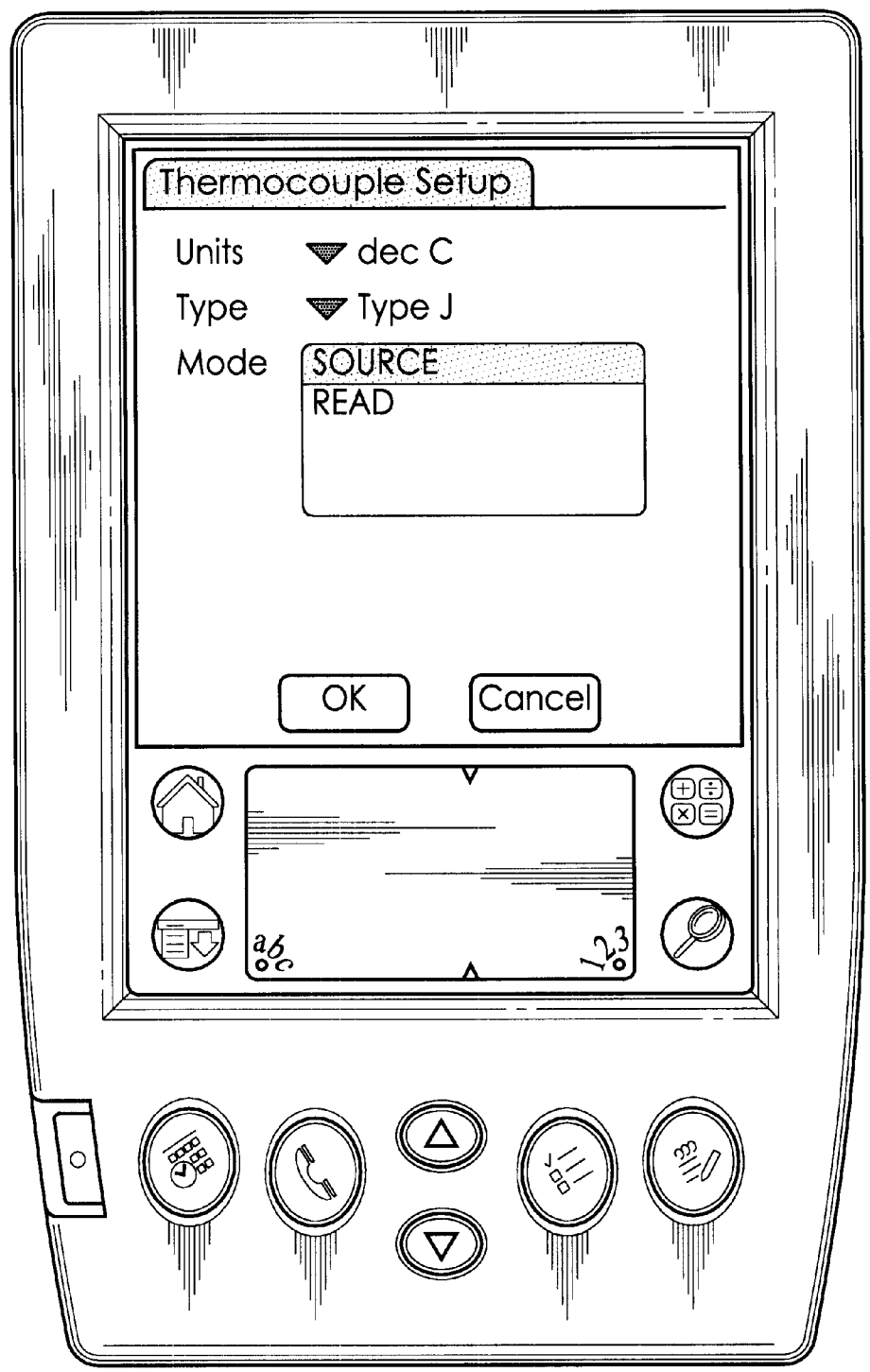
FIG. 34 is a drawing of the screen display showing the mode selection portion of the thermo couple set up procedure.

FIGS. 31 through 34 show the thermo couple set up mode of the PDA calibrator. As shown in FIG. 31, the set up mode allows the units, thermo couple type, and mode, to be set using drop down menus. As shown in FIG. 32, the units can be set to degrees Centigrade or degrees Fahrenheit by selecting the appropriate menu items. As shown in FIG. 33, the thermo couple type can be set to type J, type K, type T, and type E, selecting the appropriate menu item. As shown in FIG. 34, the mode can be set to the source mode or the read mode as desired by selecting the appropriate menu item. Okay and cancel virtual buttons act in the same way as already described.

Figure 35:
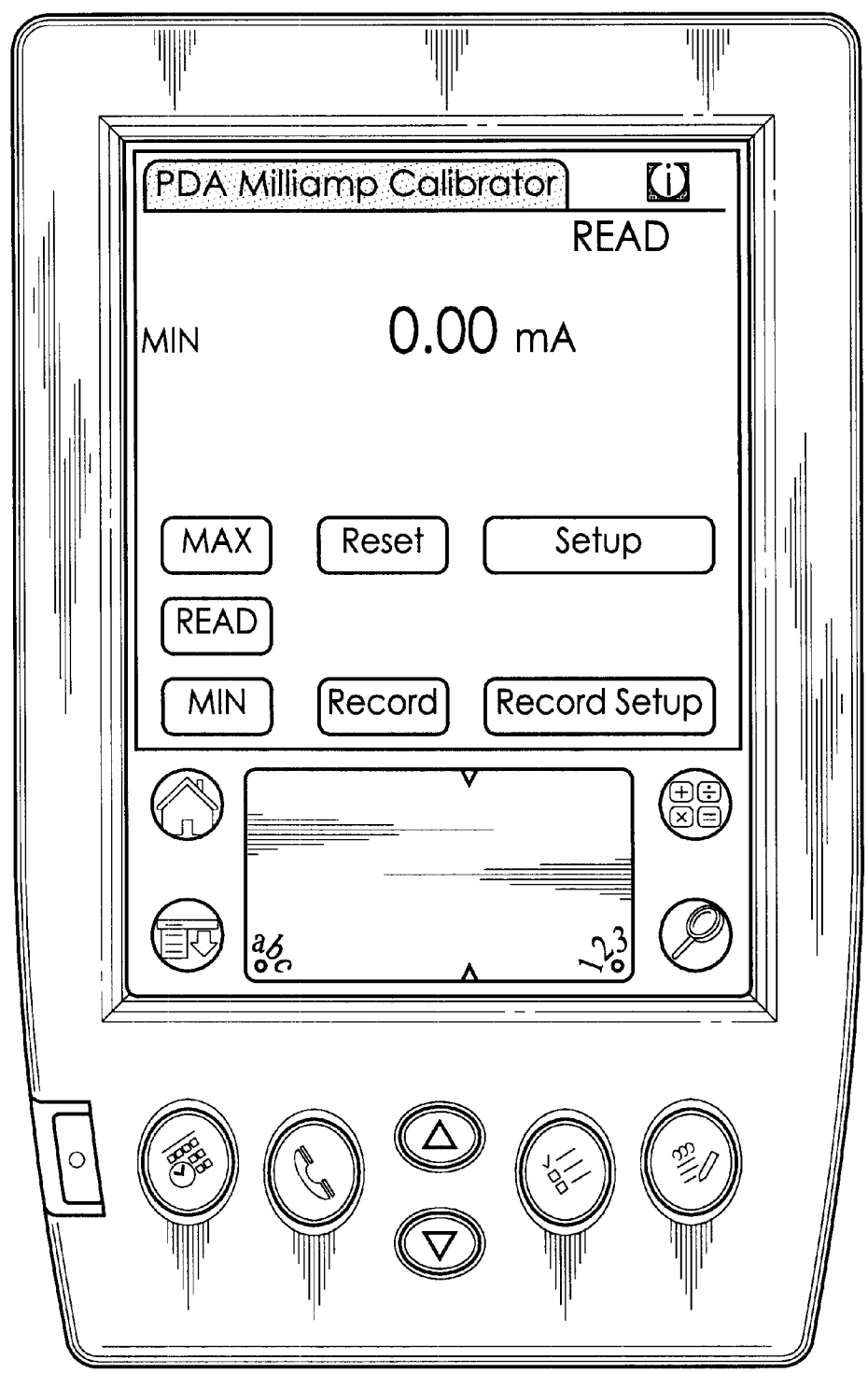
FIG. 35 is a drawing showing the screen display of the minimum current read function.
Figure 36:
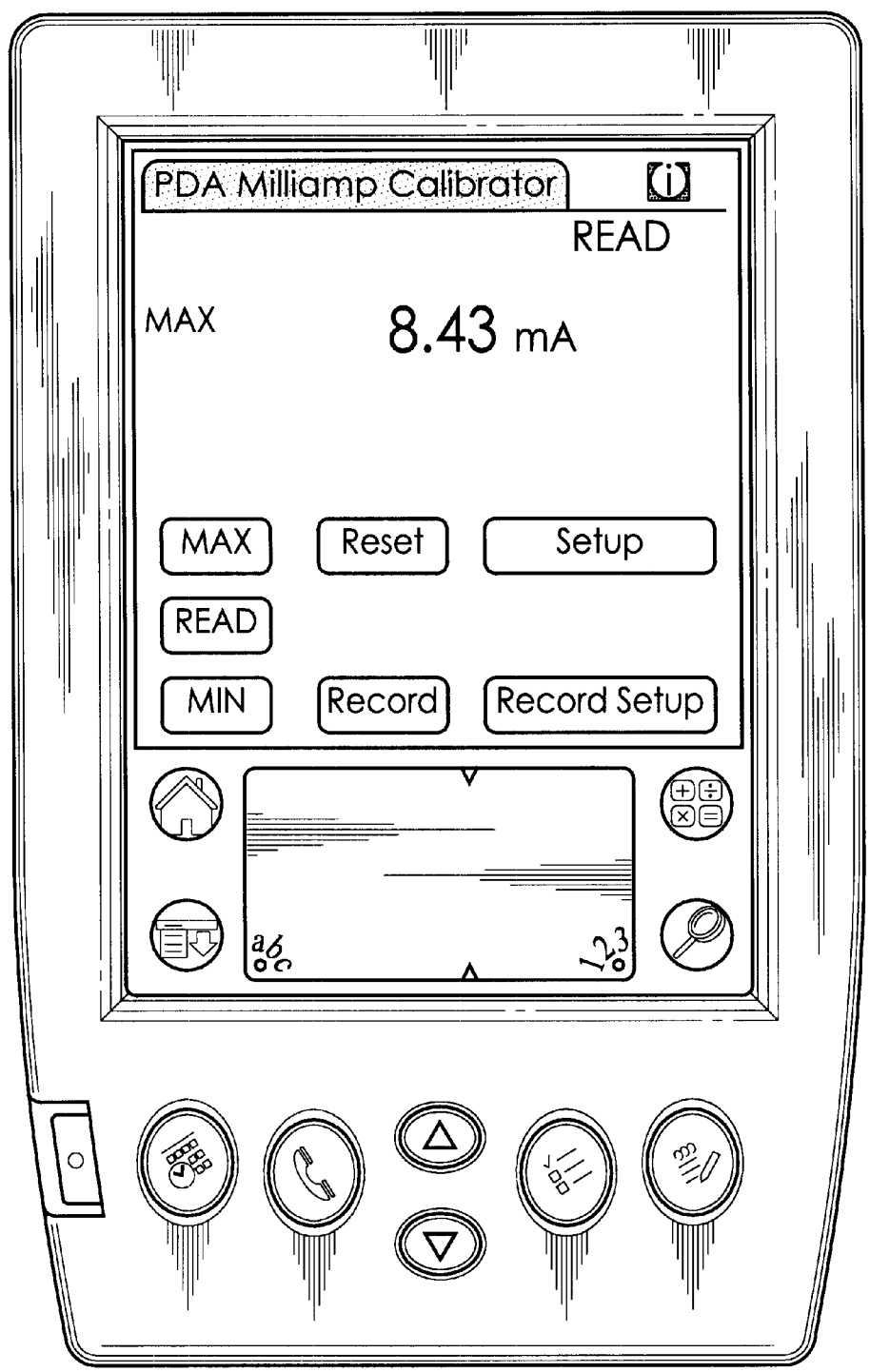
FIG. 36 is a drawing showing the screen display of the maximum current read function.
Figure 37:
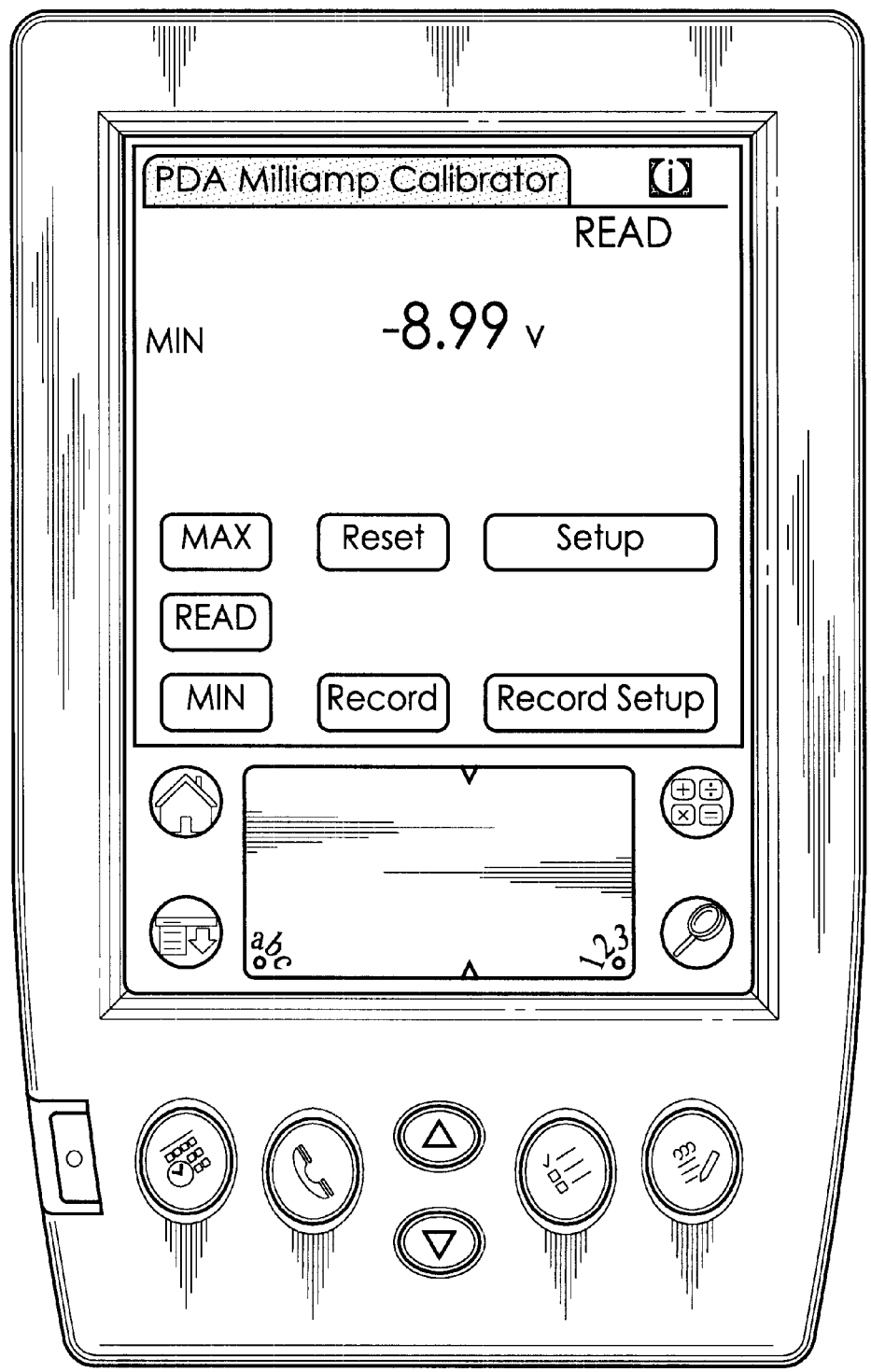
FIG. 37 is a drawing showing the screen display of the minimum voltage read function.
Figure 38:
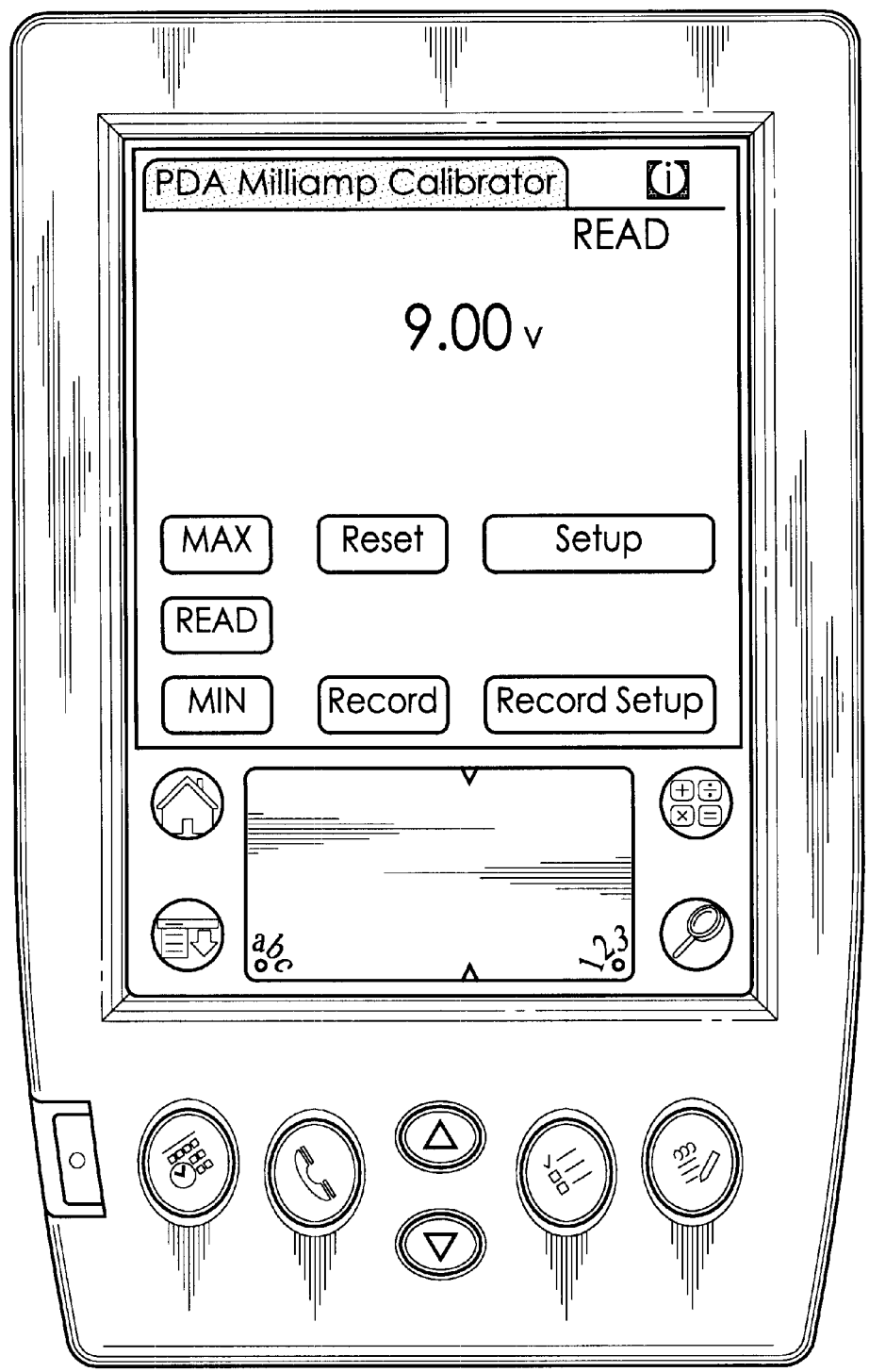
FIG. 38 is a drawing showing the screen display of the variable voltage read function.
Figure 39:
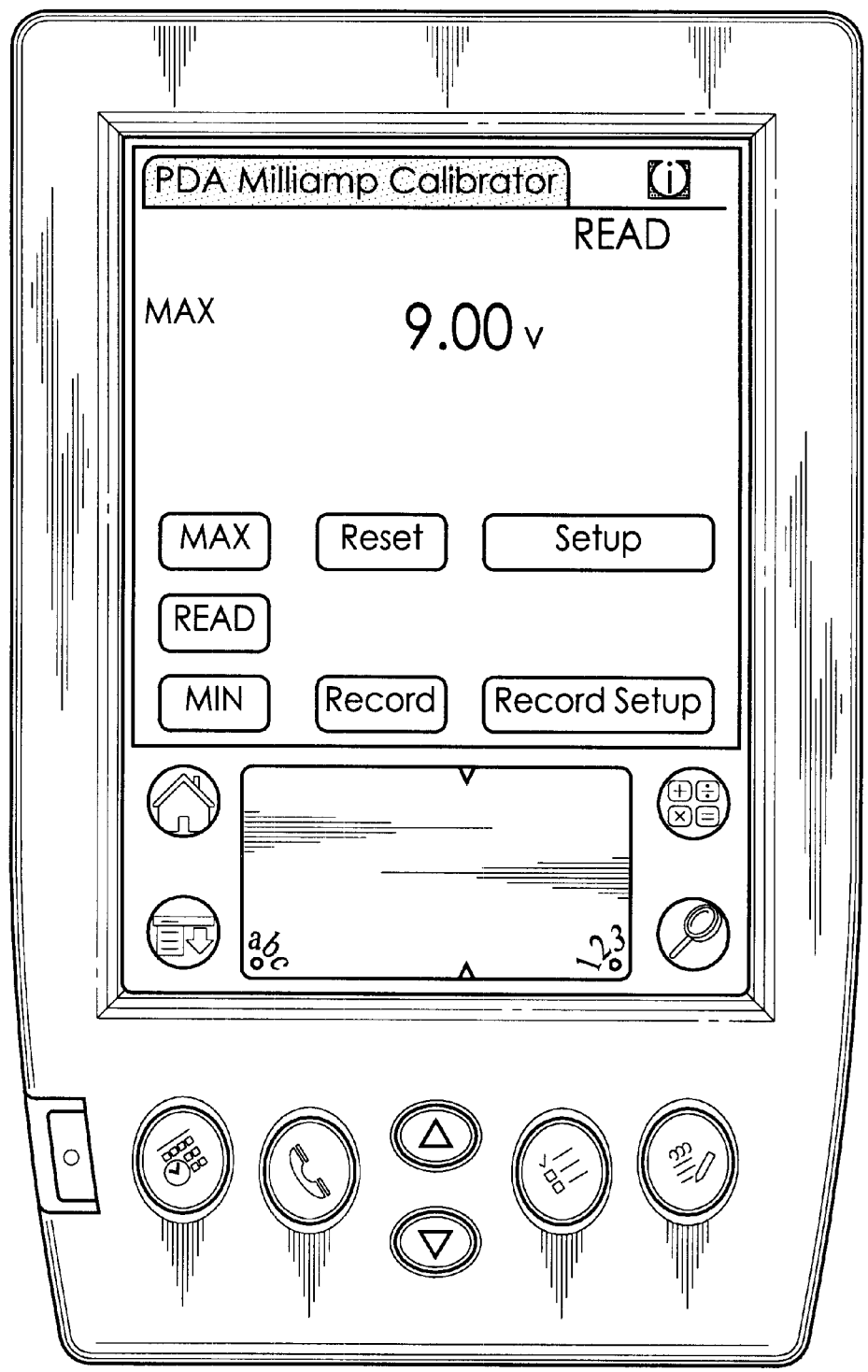
FIG. 39 is a drawing showing the screen display of the maximum voltage screen function.
Figure 40:
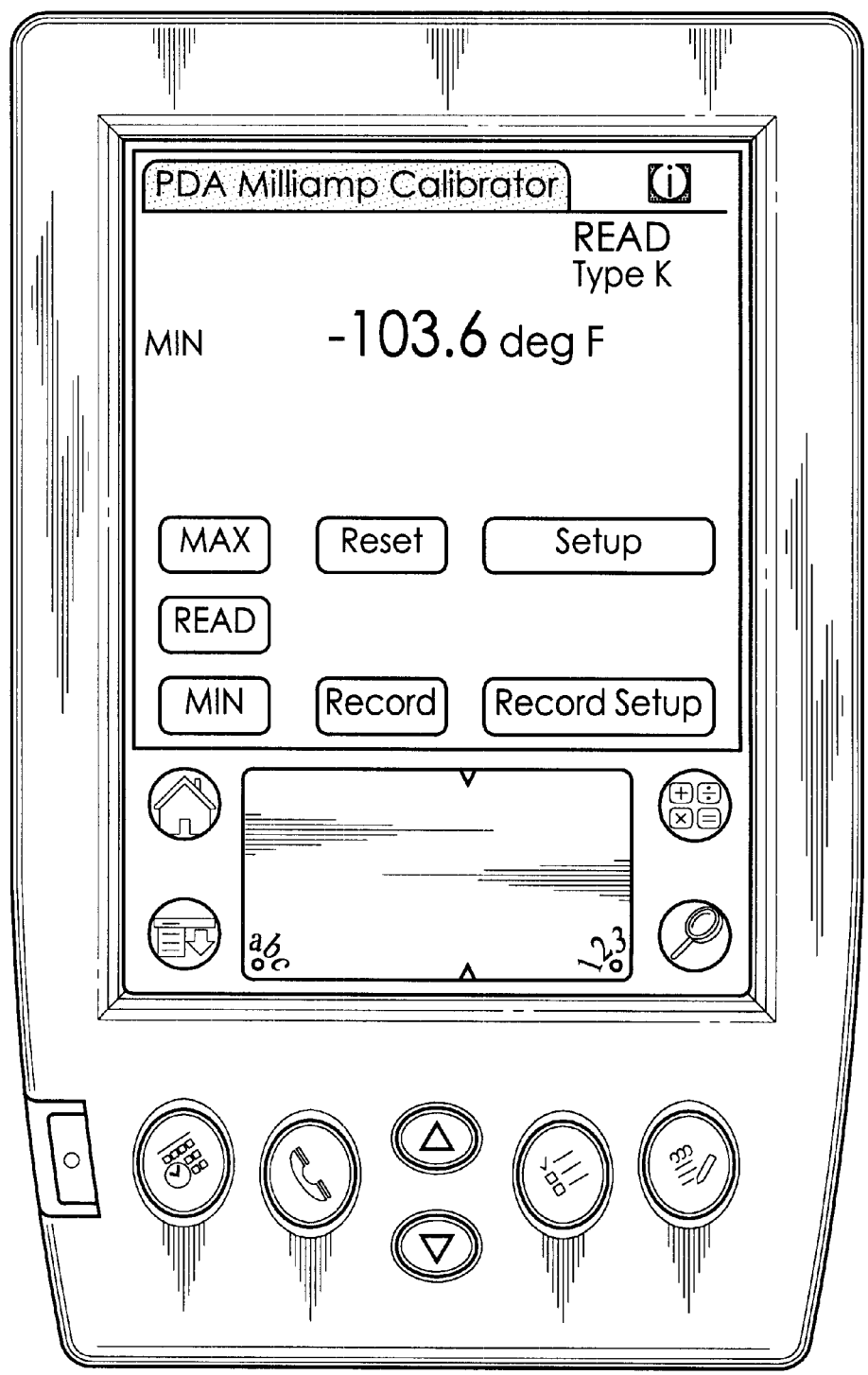
FIG. 40 is a drawing showing the screen display of the K type thermo couple minimum value read function.
Figure 41:
FIG. 41 is a drawing showing the screen display of the K type then no couple variable temperature read function.
Figure 42:
FIG. 42 is a drawing showing the screen display of the K type thermo couple maximum temperature read function.

FIGS. 35 through 42 show various read mode displays. FIGS. 35 and 36 show the minimum and maximum milliamp read modes, FIGS. 37–39 shown the minimum, nominal and maximum voltage read mode displays, and FIGS. 40–42 show the minimum, nominal and maximum type K thermo couple read mode displays.

Figure 43:
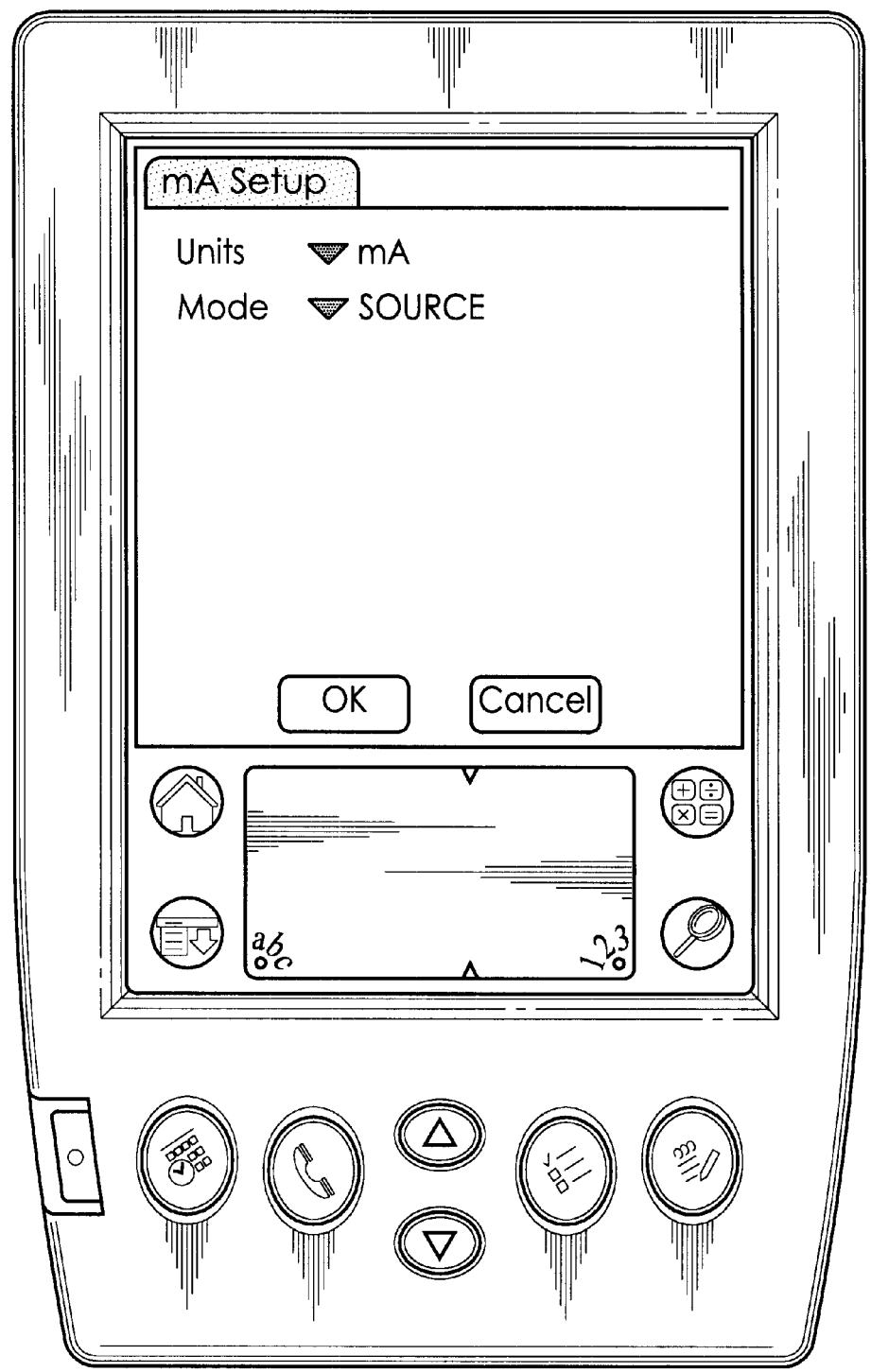
FIG. 43 a drawing showing the screen display of the milliamp current set up function.
Figure 44:
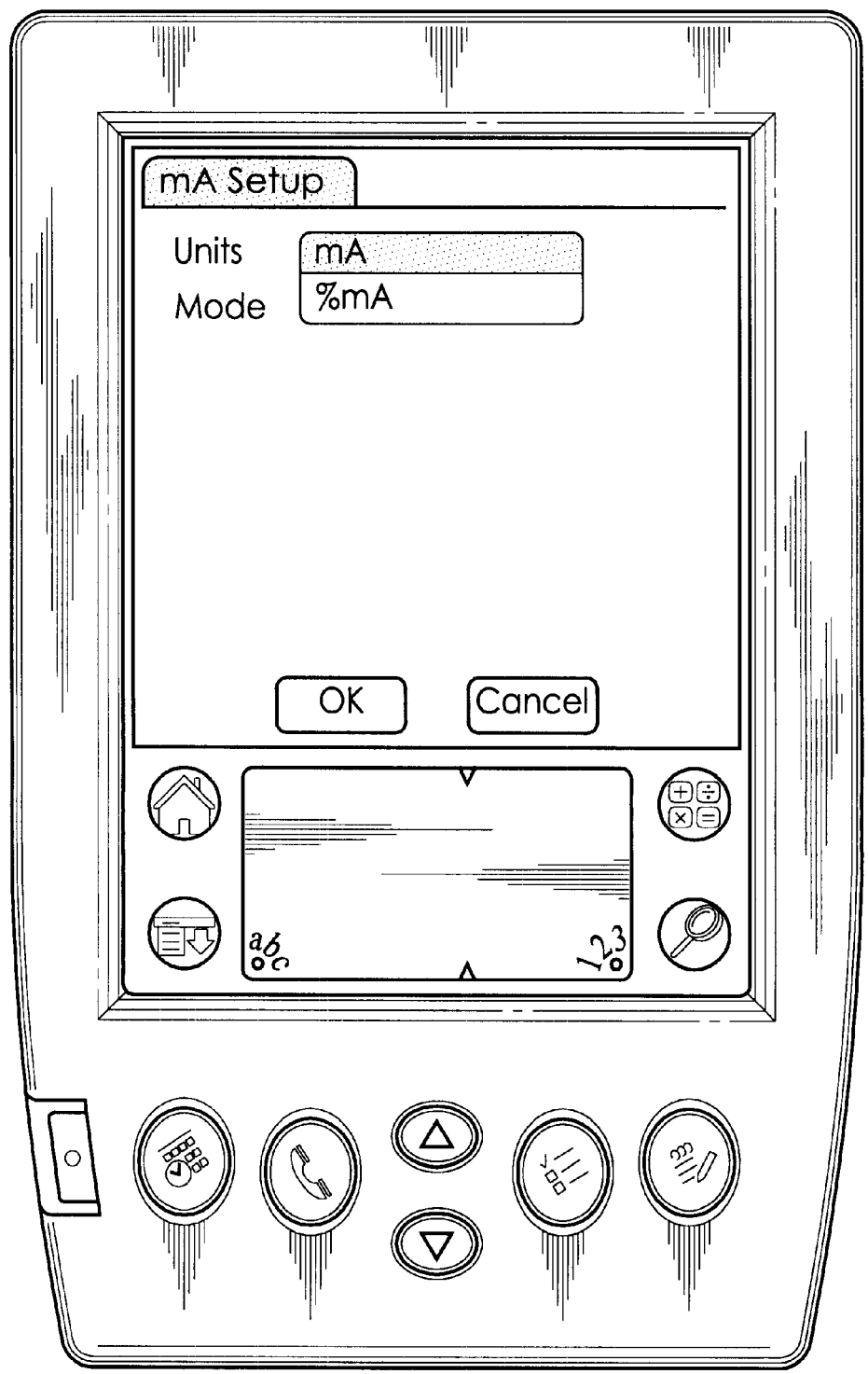
FIG. 44 is a drawing showing the selection of units in the milliamp set up procedure.
Figure 45:
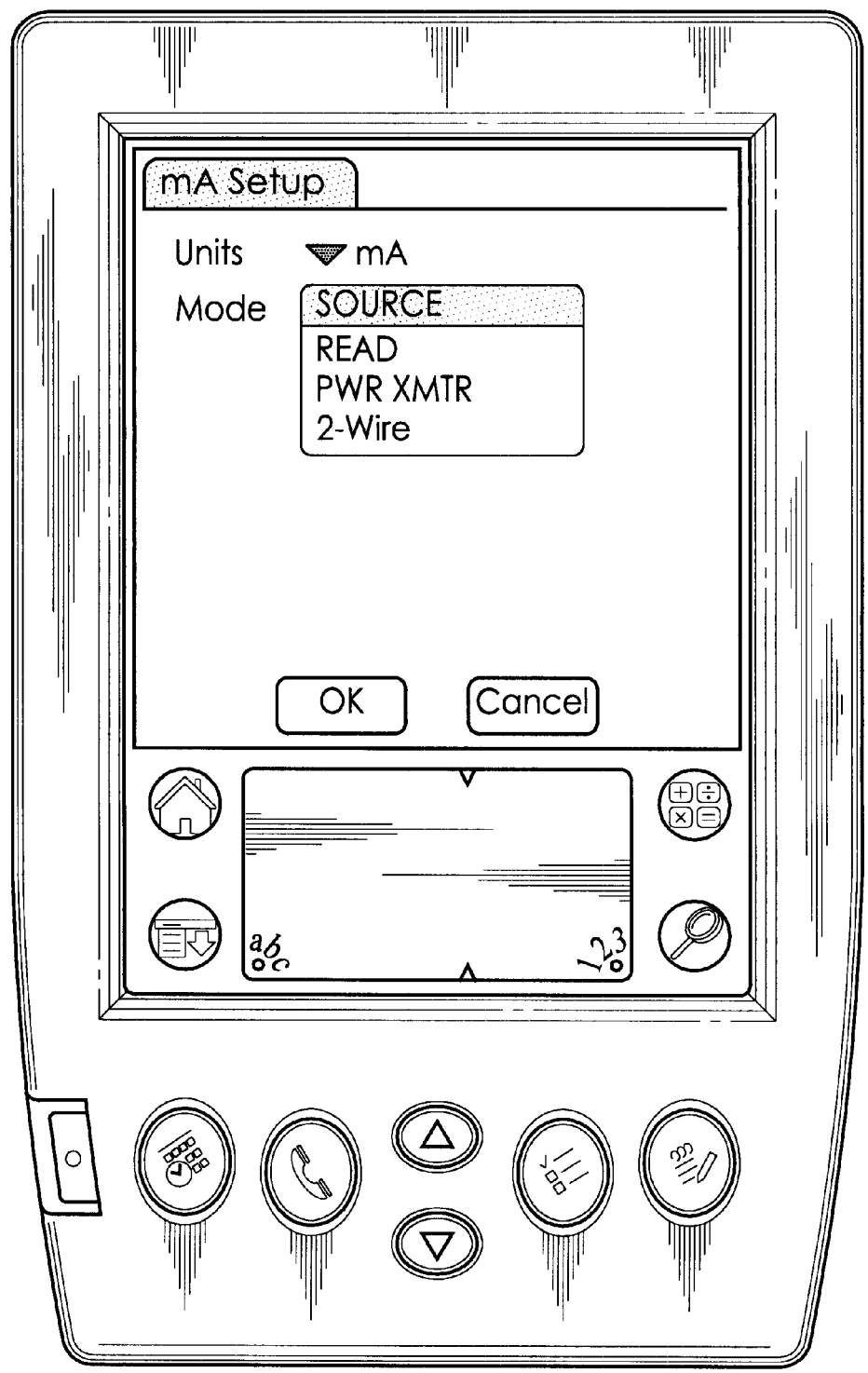
FIG. 45 is a drawing of the screen display showing the mode selectin portiton of the milliamp set up procedure.

The current set up screen display is shown in FIG. 43. This screen allows the units and the mode to be set. FIG. 44 shows the selection of the milliamp mode or the per cent milliamp mode and FIG. 45 shows the selection of the source, read, power transmitter and 2-wire modes.

Figure 46:
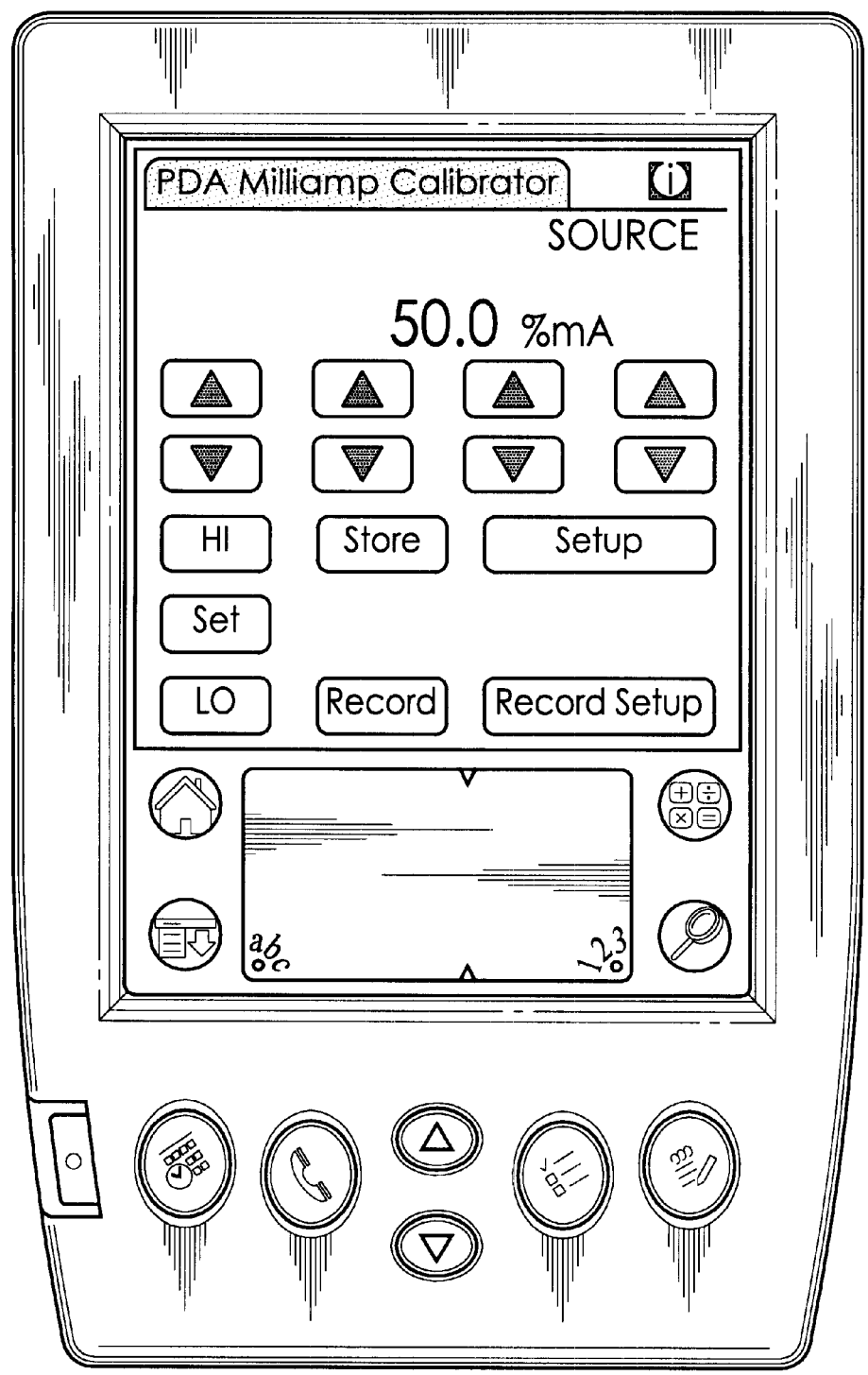
FIG. 46 is a drawing of the screen display showing the sourcing current function of the % milliamp sourcing procedure.
Figure 47:
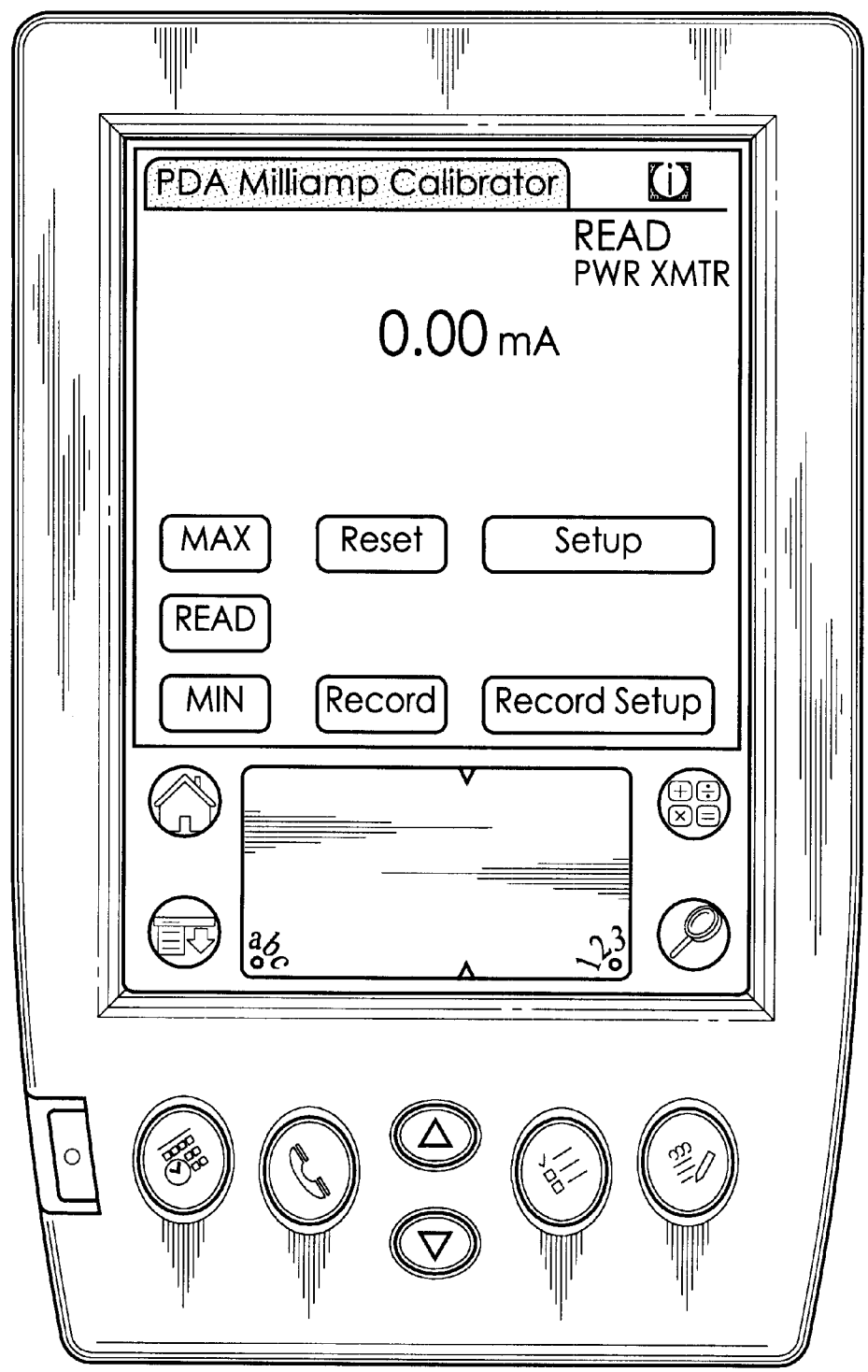
FIG. 47 is a drawing of the screen display showing the power transmitter read current function.
Figure 48:
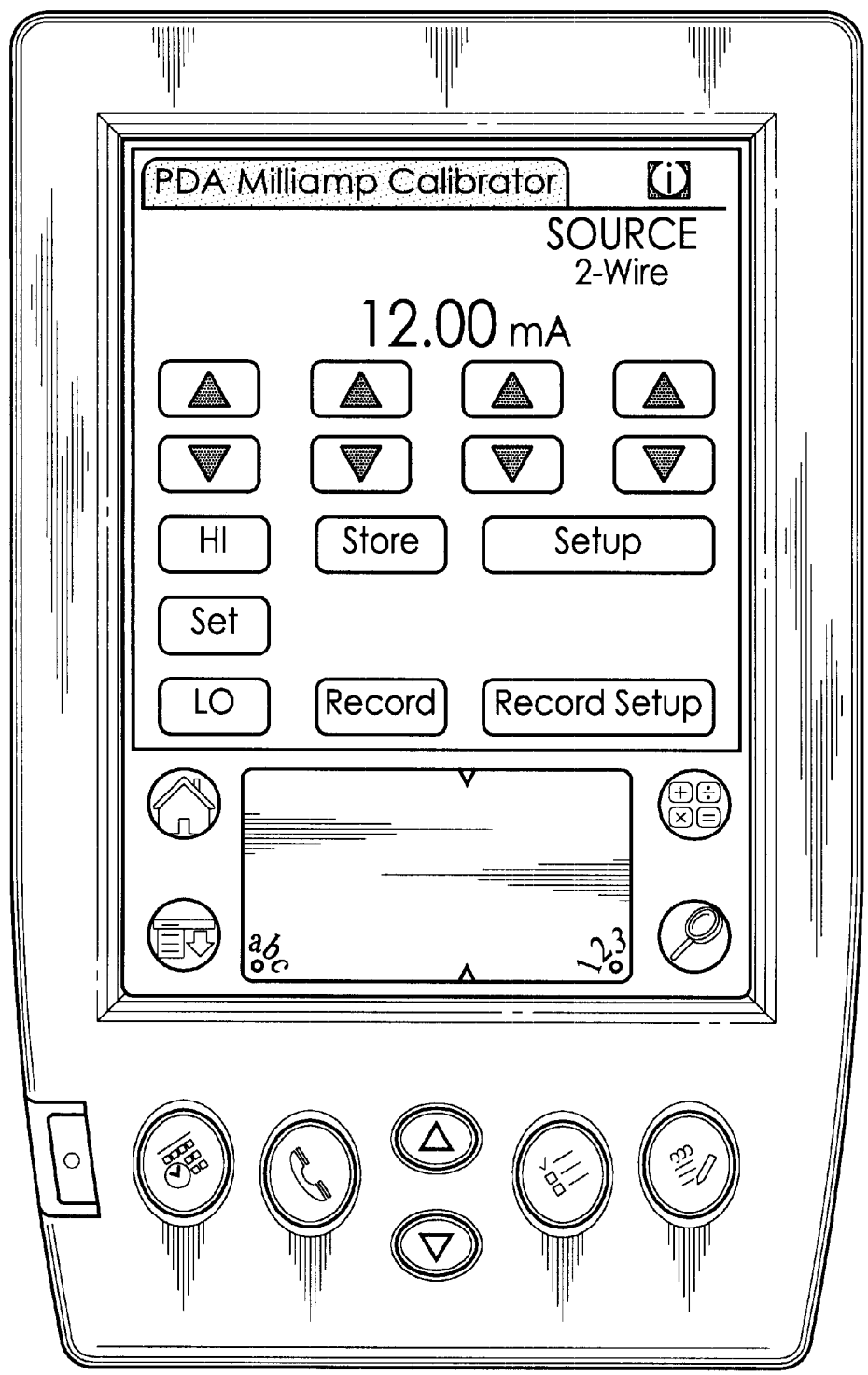
FIG. 48 is a drawing showing the two wire source current function.

FIG. 46 shows the screen display for the percent milliamp source mode. FIG. 47 shows the display for the power transmitter milliamp read mode, and FIG. 48 shows the display for the milliamp 2-wire source mode.

While the invention has been described in connection with certain presently preferred embodiments thereof, those skilled in the art will recognize that many modifications and changes may be made therein, without departing from the true spirit and scope of the invention, which accordingly is intended to be defined solely by the following claims.

What is claimed is:

1. A calibrator comprising:

a housing;

a traceable, controllable calibration source in the housing, the calibration source including memory for storing information identifying the calibrator source;

a data connector coupled to the calibration source;

a hand held computer removably attached to the housing and connected to the data connector, the computer including input means for receiving input from a user for controlling the calibration source, and output means for displaying the identifying information to the user; and a data base storing data identifying an instrument to be calibrated, a calibrator used in making the calibration, and the results of the calibration.

2. The calibrator of claim 1 in which the hand held computer comprises means for creating a new instrument record.

3. The calibrator of claim 1 in which the hand held computer comprises means for creating a new calibrator record.

4. The calibrator of claim 1 in which the hand held computer comprises means for transferring locally created instrument records and calibrator records to a host computer.

5. The calibrator of claim 1 comprising means for transferring instrument records and calibrator records from a host computer to the hand held computer.

* * * * *